United States Patent
Lin et al.

(10) Patent No.: US 9,886,475 B1
(45) Date of Patent: Feb. 6, 2018

(54) KNOWN ITEM SEARCH METHOD

(71) Applicant: GOOGLE INC., Mountain View, CA (US)

(72) Inventors: Chiung Yu Lin, Mountain View, CA (US); Alexandre A. Verstak, Cupertino, CA (US); Anurag Acharya, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 297 days.

(21) Appl. No.: 14/790,120

(22) Filed: Jul. 2, 2015

Related U.S. Application Data

(60) Provisional application No. 62/021,661, filed on Jul. 7, 2014.

(51) Int. Cl.
  *G06F 17/30* (2006.01)
  *H04L 29/08* (2006.01)

(52) U.S. Cl.
  CPC ........ *G06F 17/30424* (2013.01); *H04L 67/10* (2013.01)

(58) Field of Classification Search
  CPC ......... G06F 17/30424; G06F 17/30292; G06F 17/30; G06F 17/30563
  USPC .................................................. 707/600–899
  See application file for complete search history.

(56) References Cited

U.S. PATENT DOCUMENTS 8,260,771 B1 * 9/2012 Ortega .............. G06F 17/30997
                                                              707/723

* cited by examiner

*Primary Examiner* — Isaac M Woo
(74) *Attorney, Agent, or Firm* — Brake Hughes Bellermann LLP

(57) ABSTRACT

The disclosed implementations provide a method of searching for a known item. The method includes receiving a lookup request for the known item. The lookup request includes information identifying estimated values for a plurality of attributes of the known item. In accordance with the received lookup request, two or more estimated attribute-value pairs for the known item are estimated. In accordance with the received lookup request, a plurality of queries corresponding to the estimated attribute-value pairs are formulated in accordance with a plurality of predefined query types, each query having a corresponding position in a query type hierarchy. One or more candidate items are identified by executing one or more of the plurality of queries in accordance with the query type hierarchy. At least one of the candidate items is returned in response to the lookup request for the known item.

21 Claims, 15 Drawing Sheets http://journals.aps.org/rmp/RevModPhys.38.447

———— Article ————

On the Problem of Hidden Variables in Quantum Mechanics

Rev. Mod. Phys. 38, 447 – Published 1 July 1966

J.S. Bell

ABSTRACT: The demonstrations of von Neumann and others, that quantum mechanics does not permit a hidden variable interpretation, are reconsidered. It is shown that their essential axioms are unreasonable. It is urged that in further examination of this problem an interesting axiom would be that mutually distant systems are independent of one another.

1) A. Einstein, B. Podolsky, N. Rosen. "Can Quantum-Mechanical Description of Physical Reality Be Considered Complete?" Phys. Rev. 48, 77 (1935) LINK

2) D. Bohm. "A Suggested Interpretation of the Quantum Theory in Terms of 'Hidden' Variables." Phys. Rev. 85, 166 (1952) LINK

```
http://scholarly.search.com/scholar_lookup?
title=Can+quantum-
mechanical+description+of+physical+reality+be+considered+complete%3F&
author=A.+Einstein&
author=B.+Podolsky&       ← 412
author=N.+Rosen&
journal=Physical+Review&
volume=48&
issue=10&
pages=777-780&
publication_year=1935

406
```
410 (circled: author=A.+Einstein&)

Can Quantum-Mechanical Description of Physical Reality Be Considered Complete?

http://journals.aps.org/pr/abstract/10.1103/PhysRev.47.777

A. Einstein, B. Podolsky, and N. Rosen

Phys. Rev. 47, 777 – Published 15 May 1935

408-a

---

Can Quantum-Mechanical Description of Physical Reality Be Considered Complete?

http://journals.aps.org/pr/abstract/10.1103/PhysRev.48.696

N. Bohr

Phys. Rev. 48, 696 – Published 15 October 1935

428 http://open-university.edu/einstein/r2Ef3Mn4/

──────── Article ────────

Can Quantum-Mechanical Description of
Physical Reality Be Considered Complete?

Phys. Rev. 47, 777 – Published 15 May 1935

A. Einstein, B. Podolsky, N. Rosen

ABSTRACT: In a complete theory there is an element corresponding to each element of reality. A sufficient condition for the reality of a physical quantity is the possibility of predicting it with certainty, without disturbing the system. In quantum mechanics in the case of two physical quantities described by non-commuting operators, the knowledge of one precludes the knowledge of the other. Then either (1) the description of reality given by the wave function in quantum mechanics is not complete or (2) these two quantities cannot have simultaneous reality. Consideration of the problem of making predictions concerning a system on the basis of measurements made on another system that had previously interacted with it leads to the result that if (1) is false then (2) is also false. One is thus led to conclude that the description of reality as given by a wave function is not complete.

No citations

Figure 4E

KNOWN ITEM SEARCH METHOD

CROSS REFERENCE TO RELATED APPLICATION

This application is a Nonprovisional of, and claims priority to, U.S. Patent Application No. 62/021,661, filed on Jul. 7, 2014, entitled "KNOWN ITEM SEARCH METHOD", which is incorporated by reference herein in its entirety.

TECHNICAL FIELD

The disclosed implementations relate to methods, server systems, and computer readable storage media for performing known item searches (also called "known item lookups" or "known item retrieval").

BACKGROUND

As the informational world has grown in size and become more connected, methods of searching for information have become ubiquitous and essential. To be sure, the wealth of information available on the Internet is far less useful if the desired information is difficult to find. In contrast to exploratory information seeking, in which any and all items relevant to a query are desired, known item searching is a type of search directed toward finding specific objects (e.g., a specific book, a periodical, a video, a song, or a database record). In some ways, known item searching is analogous to visiting a library looking for a particular book, rather than going to a library looking for information on a particular topic.

Computer-implemented methods of known item searching are used in a variety of applications. Such methods are generally precise, meaning that any inaccurate information conveyed in a known item lookup request will cause conventional methods to miss the known item, even if accurate information is also submitted. The result is a conservative paradigm in known item searching: it is preferable, using conventional methods, to withhold potentially incorrect information (e.g., a "best guess") rather than to submit the potentially incorrect information and risk a search miss.

SUMMARY

Accordingly, there is a need for accurate systems and methods of known item searching that reliably return a known item in response to a known item lookup request even when information submitted in the known item lookup request is inaccurate and/or erroneous. Therefore, in accordance with some implementations, methods, systems, and computer-readable storage media are proposed for known item searching.

In some implementations, the method is performed at a server system and includes receiving a lookup request for a known item. The lookup request includes information identifying estimated values for a plurality of attributes of the known item. In accordance with the received lookup request the method includes determining two or more estimated attribute-value pairs for the known item, each estimated attribute-value pair including an attribute and a respective estimated value identified in the lookup request, and formulating a plurality of queries corresponding to the estimated attribute-value pairs in accordance with a plurality of predefined query types. Each formulated query has a corresponding position in a query type hierarchy. The method further includes identifying one or more candidate items by executing one or more of the plurality of queries in accordance with the query type hierarchy and returning at least one of the candidate items in response to the lookup request for the known item.

In some implementations, determining the two or more estimated attribute-value pairs includes parsing the lookup request. In some implementations, parsing the lookup request includes using predefined structural lookup information in the lookup request to identify the attribute corresponding to each estimated attribute-value pair. In some implementations, parsing the lookup request includes automatically identifying at least one attribute corresponding to an estimated attribute-value pair of the determined two or more estimated attribute-value pairs without using predefined structural lookup information in the lookup request.

In some implementations, each query type of the plurality of predefined query types corresponds to a query for a predefined attribute or a query for a predefined combination of attributes.

In some implementations, the query types are positioned in the query type hierarchy in order of decreasing precision with respect to each query type's ability to uniquely identify known items.

In some implementations, the known item is one of: an image, an audio recording, a multimedia object, an item offered by an online vendor, or a database record.

In some implementations, the known item is an online publication. In some implementations, the plurality of attributes includes two or more of the group consisting of: an author attribute, a title attribute, a volume attribute, an issue attribute, a page attribute, a publication date attribute, and a unique object identifier.

In some implementations, at least one of the attributes in the plurality of attributes comprises a metadata attribute for the known item.

In some implementations, the method further includes, after identifying the one or more candidate items, filtering the one or more candidate items to produce the at least one returned candidate item. In some implementations, filtering the one or more candidate items includes, for each of the one or more candidate items, identifying two or more attribute-value pairs for the candidate item. Filtering the one or more candidate items further includes determining if the two or more attribute-value pairs for the candidate item meet predefined criteria with respect to corresponding estimated attribute-value pairs. In accordance with a determination that the two or more attribute-value pairs of the candidate item meet the predefined criteria with respect to the corresponding estimated attribute-value pairs, filtering the one or more candidate items further includes maintaining the candidate item as a candidate to return and, in accordance with a determination that the two or more attribute-value pairs of the candidate item do not meet the predefined criteria with respect to the corresponding estimated attribute-value pairs, removing the candidate item as a candidate to return.

In some implementations, the predefined criteria indicate a predefined high degree of certainty that the candidate item is the known item. Returning the at least one of the candidate items further comprises, for a respective candidate item, in accordance with a determination that the two or more attribute-value pairs for the candidate item meet the predefined criteria with respect to the corresponding estimated attribute-value pairs, returning only the candidate item.

In some implementations, failure to meet the predefined criteria indicates a predefined high degree of certainty that a candidate item is not the known item.

In some implementations, determining if the two or more attribute-value pairs for the candidate item meet the predefined criteria with respect to the corresponding estimated attribute-value pairs includes comparing the two or more attribute-value pairs for the candidate item to the corresponding estimated attribute-value pairs.

In some implementations, identifying the one or more candidate items includes executing a first subset of the plurality of queries; determining whether execution of the first subset of the plurality of queries resulted in less than a predefined count of candidate items; and in accordance with a determination that execution of the first subset of the plurality of queries resulted in less than the predefined count of candidate items, executing a second subset of the plurality of queries. Each query of the second subset of the plurality of queries has a lower position in the query type hierarchy than any query in the first subset of the plurality of queries.

In another aspect of the present invention, to address the aforementioned limitations of known item searching, another method is provided. The method is performed at a server system and includes receiving a lookup request for a known item. The lookup request includes information identifying estimated values for a plurality of attributes of the known item. The method further includes formulating one or more queries corresponding to two or more estimated attribute-value pairs for the known item, in accordance with a plurality of predefined query types and in accordance with the information in the lookup request identifying estimated values for the plurality of attributes of the known item. The method further includes identifying a set of candidate items by executing the one or more queries. The method still further includes evaluating a candidate item of the set of candidate items with respect to consistency of attribute-value pairs for the candidate item with the two or more estimated attribute-value pairs for the known item and returning the evaluated candidate item as the known item in accordance with a determination that the attribute-value pairs for the candidate item satisfy a consistency criterion with respect to the two or more estimated attribute-value pairs for the known item.

In another aspect of the present invention, to address the aforementioned limitations of known item searching, some implementations provide a non-transitory computer readable storage medium storing one or more programs. The one or more programs comprise instructions, which when executed by a server system with one or more processors and memory, cause the server system to perform any of the methods provided herein.

In yet another aspect of the present invention, to address the aforementioned limitations of known item searching, some implementations provide a server system. The server system includes one or more processors, memory, and one or more programs. The one or more programs are stored in memory and configured to be executed by the one or more processors. The one or more programs include an operating system and instructions that when executed by the one or more processors cause the server system to perform any of the methods provided herein.

BRIEF DESCRIPTION OF THE DRAWINGS

FIG. 4A illustrates an example of a use case of a known item search, in accordance with some implementations.

FIG. 4B illustrates a graphical example of a known item lookup request and graphical examples of resulting candidate items, in accordance with some implementations.

FIG. 4E illustrates a continuation of the use case of a known item search shown in FIG. 4D, in accordance with some implementations.

Like reference numerals refer to corresponding parts throughout the drawings.

DETAILED DESCRIPTION

Figure 1:
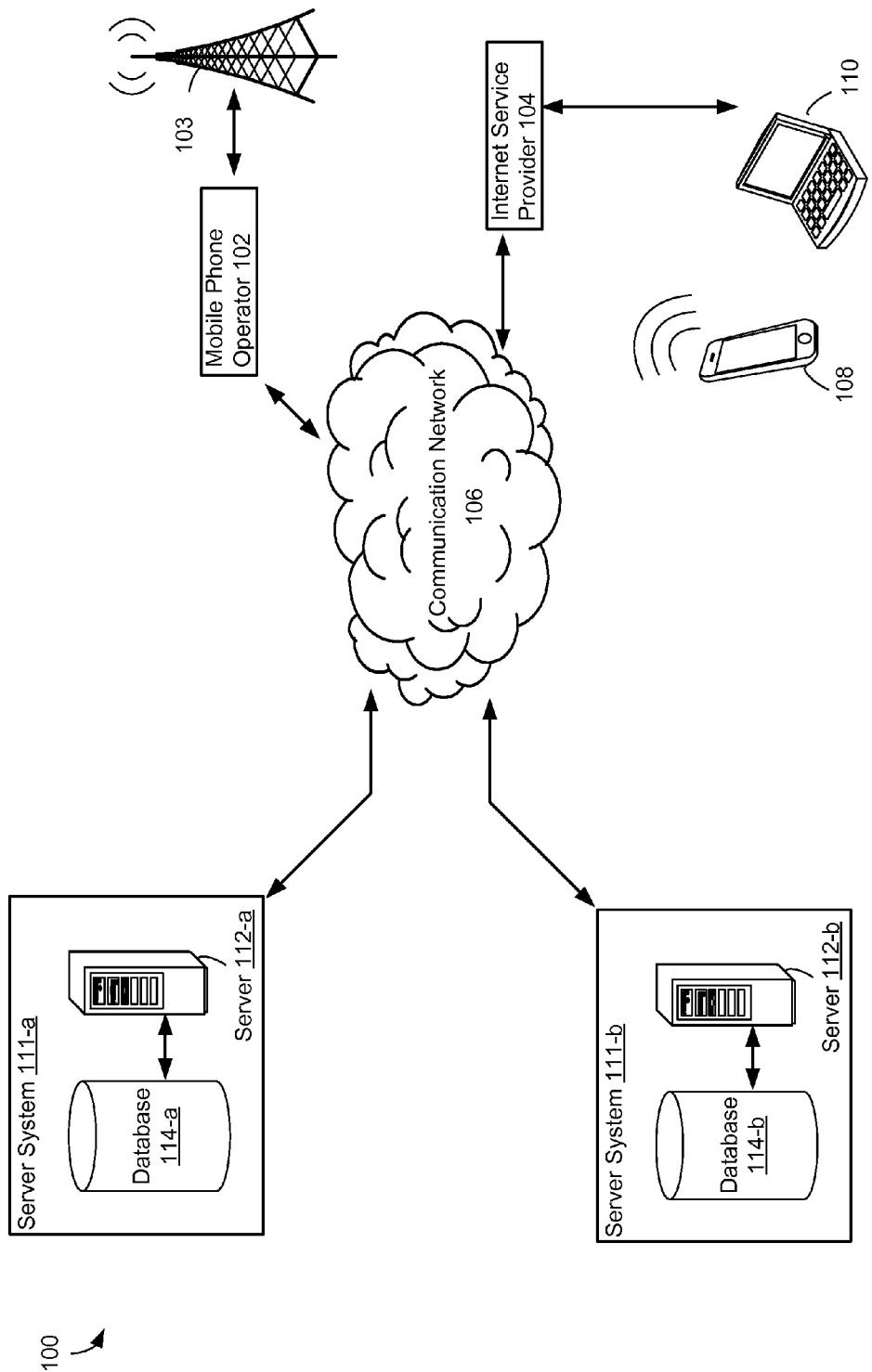
FIG. 1 is a diagram of a client-server environment, in accordance with some implementations.

As noted above, computer-implemented known item searching is generally precise, resulting in a conservative paradigm in known item searching: namely, it is preferable using conventional methods to withhold, in a known item lookup request, potentially incorrect information (e.g., a "best guess") rather than to submit the potentially incorrect information and risk a search miss. Some of the implementations described herein change that paradigm by encouraging submission of any and all information thought to be true about the known item.

Consider, as one example, a known item search for a scholarly article. There are many reasons why one would want to do a known item search for a scholarly article, some of which are described in detail below. A common way to identify a scholarly article is by its citation, which includes attributes about the scholarly article such as a list of the authors, the name of the scholarly article, the journal it was published in, the year of its publication, and so on. However, citations are notoriously error prone, especially when transcribed by hand, as is often the case. When a known item search is performed using a single query based on an erroneous citation, and requires precise matching of all attributes that are present, the scholarly article will not be returned by the search.

Instead, some implementations described below formulate a plurality of queries, each with some, but not all, of the attributes. The result is that erroneous information is likely to be omitted from at least one of the queries, which will return the known item as a candidate item. In this manner, a set of candidate items is formed by a combination of results from different queries based on a single known item lookup request. In some implementations, the candidate items are evaluated based on consistency with the rest of the lookup request. For example, in some implementations, when a lookup request includes a publication year of 1935, candidate articles published more than five years before or after 1935 are determined to be inconsistent with the lookup request. In some implementations, when a single candidate item is determined to be the known item with a high enough confidence, the single candidate item is returned. Otherwise, if each of a plurality of candidate items is determined to be consistent with the lookup request, the plurality of candidate items is returned.

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

FIG. 1 is a diagram of client-server environment 100, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, client-server environment 100 includes server system 111-*a*, which stores known items in database 114-*a* and performs searches for known items (as well as other tasks) using server 112-*a*. Client-server environment 100 also includes server system 111-*b*, which transmits requests for known items (e.g., known item lookup requests) to server system 111-*a* and is therefore, in some circumstances, a client of server system 111-*a*. Server system 111-*b* includes server 112-*b* and database 114-*b*. As used herein, the term "client" is intended to, in some circumstances, include servers, e.g., when said servers are accessing services that are made available by another server, and therefore are acting as clients.

Client-server environment 100 further includes one or more mobile phone operators 102, one or more Internet service providers 104, and a communications network 106.

Mobile phone operator 102 (i.e., wireless carrier), and Internet service provider 104 are capable of being connected to communication network 106 in order to exchange information with one another and/or other devices and systems. Additionally, mobile phone operator 102 and Internet service provider 104 are operable to connect client devices to communication network 106 as well. For example, smart phone 108 is operable with the network of mobile phone operator 102, which includes for example, base station 103. Similarly, for example, personal computer 110 (e.g., a laptop computer, tablet, desktop, smart television, workstation or the like) is connectable to the network provided by Internet service provider 104, which is ultimately connectable to communication network 106.

Communication network 106 may be any combination of wired and wireless local area network (LAN) and/or wide area network (WAN), such as an intranet, an extranet, including a portion of the Internet. It is sufficient that communication network 106 provides communication capability between client devices (e.g., smart phones 108 and personal computers 110) and servers. In some implementations, communication network 106 uses the HyperText Transport Protocol (HTTP) to transport information using the Transmission Control Protocol/Internet Protocol (TCP/IP). HTTP permits a client device to access various resources available via communication network 106. However, the various implementations described herein are not limited to the use of any particular protocol.

In this manner, smart phone 108 and personal computer 110 (collectively referred to as "client device 108/110") are, in some circumstances, clients of server system 111-*a* and/or server system 111-*b*. For example, in some circumstances, as explained in greater detail below, client device 108/110 sends a search request to server system 111-*b*, which triggers server system 111-*a* to send a known item lookup request to server system 111-*a*.

As will be understood by one of ordinary skill in the art, the known items described herein may be nearly any type of item. For example, in various implementations, the known items include images (e.g., photos), audio recordings (e.g., songs, podcasts), multimedia objects (e.g., videos, multimedia advertisements), items offered by an online vendor, database records (e.g., records of registered attorneys in a state's attorney registry), and/or other types of items. However, for the sake of understanding, the following several paragraphs describe two specific examples of client-server relationships in which known items are searched for.

In a first example, in some implementations, server system 111-*a* maintains records of scholarly articles (e.g., articles published in a scholarly journal such as *Nature* or *Physical Review Letters*) and provides a known item search functionality to publishers (e.g., as well as others who may want to invoke the known item search functionality). Server system 111-*b* is a publisher's server (e.g., a publisher of a scholarly journal such as *Nature* or *Physical Review Letters*). This example is described in greater detail with reference to FIGS. 4A-4E.

There are any number of reasons that a publisher's server may wish to search server system 111-*a* for a known item. Take as an example a typical situation in which a group of scientists write and submit an article for publication in the publisher's journal. Such articles will often include citations that are appended in the submitted article in a text format. These citations often include typographical errors. By searching (e.g., submitting a known item lookup request or known item search request to) server system 111-*a* using the information provided by the citation, in accordance with some implementations, the publisher can obtain a correct (e.g., verified) citation, which is returned by server system 111-*a* for use in the published article (e.g., in lieu of the erroneous citation). In addition, the publisher may wish to publish a URL (universal resource locator) link to the cited articles on the publisher's website. Yet it is inefficient for the publisher to manually track down such URL links. In various implementations, the known item returned by server system 111-*a* includes a URL link. Thus, briefly, in some implementations, a publisher searches server system 111-*a* to correct citations and obtain URL links to cited articles.

In a second example, server system 111-*a* is an online retailer's server system and server system 111-*b* hosts a website that helps consumers find the best price on specific goods and services. For example, a consumer may wish to buy a NIKON™ COOLPIX L830 camera. Rather than "bargain shopping" for the best price by visiting several online retailer's websites, the consumer can visit the website provided by server system 111-*b* and request an aggregated summary of prices from a plurality of online retailers for the camera (or, alternatively, a URL link to the online retailer with the best price for the camera). To that end, server system 111-*b* searches (e.g., submits a known item lookup or known item search request to) a plurality of online retailer's server systems, one of which is server system 111-*a*. The implementations described herein, in some circumstances, allow such a search to successfully lookup the wanted item (e.g., the NIKON™ COOLPIX L830 camera) even if the consumer has erroneously entered the details of the item (e.g., by entering a search for a NIKON™ COOLPICKS L830 camera).

Those skilled in the art will appreciate from the present disclosure that any number of such devices and/or systems may be provided in a client-server environment, and particular devices may be altogether absent. In other words, client-server environment 100 is merely an example provided to discuss more pertinent features of the present disclosure.

Figure 2:
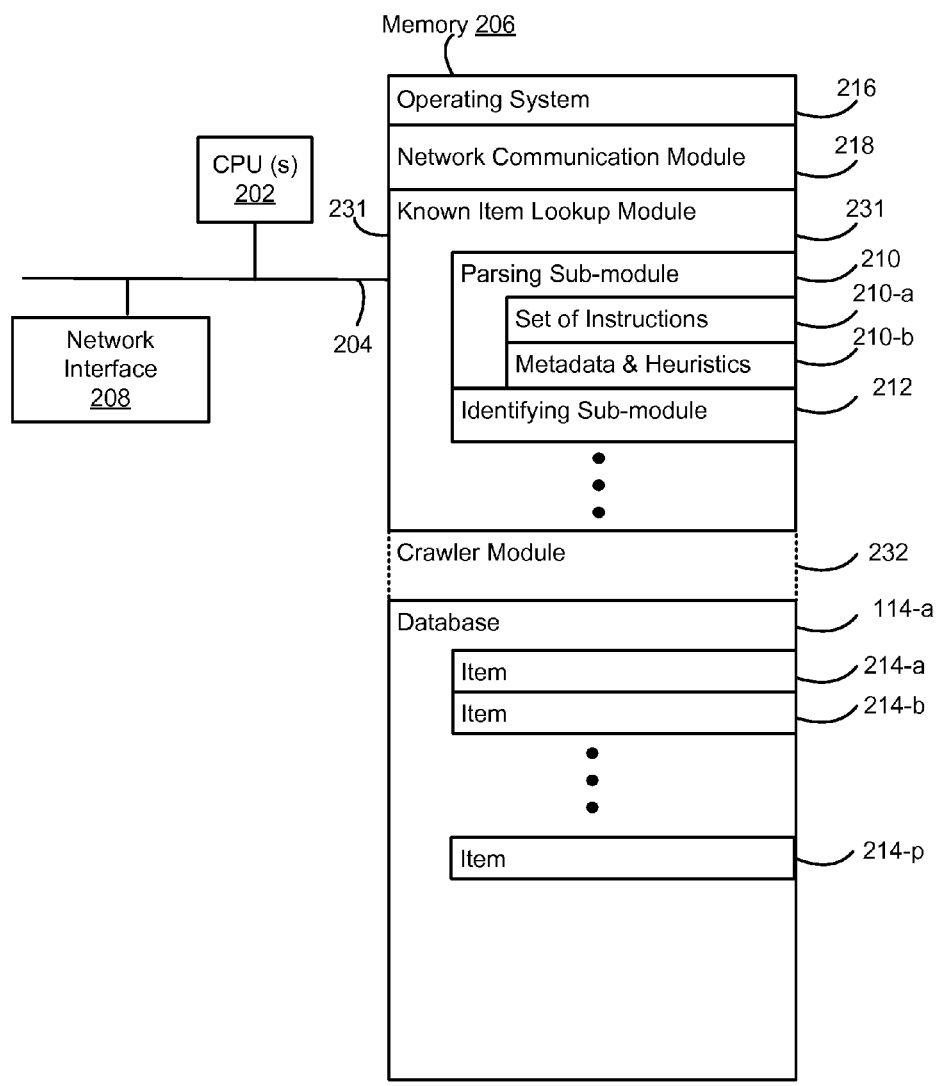
FIG. 2 is a block diagram illustrating an example of a server system, discussed above with reference to FIG. 1, in accordance with some implementations.

FIG. 2 is a block diagram illustrating an example of server system 111-a, discussed above with reference to FIG. 1, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, server system 111-a includes one or more processing units (CPUs) 202, one or more network or other communications interfaces 208, memory 206, and one or more communication buses 204 for interconnecting these and various other components. Communication buses 204 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from CPU(s) 202. Memory 206, including the non-volatile and volatile memory device(s) within memory 206, comprises a non-transitory computer readable storage medium.

In some implementations, memory 206 or the non-transitory computer readable storage medium of memory 206 stores the following programs, modules and data structures, or a subset thereof including operating system 216, network communication module 218, known item lookup module 231, optional crawler module 232, and database 114.

Operating system 216 includes procedures for handling various basic system services and for performing hardware dependent tasks.

Network communication module 218 facilitates communication with other devices (e.g., other server systems 111 as well as client devices 108/110) via one or more network interfaces 208 (wired or wireless) and one or more communication networks, such as the Internet, other wide area networks, local area networks, metropolitan area networks, and so on.

Known item lookup module 231 is configured to receive, from a client, a lookup request for a known item. The lookup request includes estimated values for a plurality of attributes of the known item. For example, when the known item is a scholarly article, the lookup request may include an estimated digital object identifier (DOI), estimated author names, an estimated title, an estimated publication year, etc. As used herein, received values of attribute-value pairs are referred to as "estimated" because the disclosed implementations provide methods of searching for a known item that are robust to certain errors in the received attribute-value pairs used to search for the known item. Thus, the disclosed implementations promote inclusion in the known item lookup request of any and/or all information that is known, or thought to be known, about the known item, even if that information may be inaccurate. In contrast, when conventional known item lookup methods are used, inclusion of inaccurate information in a known item lookup request will often cause a lookup miss.

To that end, in some implementations, known item lookup module 231 determines two or more estimated attribute-value pairs for the known item by parsing the lookup request using predefined structural lookup information (e.g., tags) in the lookup request to identify the attribute corresponding to each estimated attribute-value pair (e.g., as explained below with reference to FIG. 4B). Alternatively, known item lookup module parses the lookup request by automatically identifying attributes corresponding to an estimated attribute-value pair without using predefined structural lookup information (e.g., tags) in the lookup request. In some implementations, the parsing is performed by parsing sub-module 210 (which includes a set of instructions 210-a and metadata and heuristics 210-b).

Known item lookup module 231 formulates a plurality of queries corresponding to the estimated attribute-value pairs in accordance with a plurality of predefined query types. In some implementations, the queries are executed in a prescribed order in accordance with a query type hierarchy. In some implementations, the query type hierarchy ranks query types by their respective ability to precisely determine the identity of a known item. For example, if accurate, a digital object identifier (DOI) identifies an electronic document with a high degree of precision (e.g., even more precision than a title and listing of authors of the electronic document). Therefore, in some implementations, known item lookup module 231 will execute a query based on a DOI attribute-value pair prior to executing a query based on author/title attribute-value pairs. In some implementations, the most precise query (according to the query type hierarchy) to return an item (e.g., that is consistent with the remainder of the known item lookup request) is used to identify (e.g., using identifying sub-module 212) the known item.

In some implementations, the queries are directed toward items 214 stored in database 114-a. For example, database 114-a includes a plurality of items (e.g., item 214-a, item 214-b, through item 214-p). Items 214 are stored as data structures, which is described in greater detail with reference to FIGS. 3A-3B.

Optional crawler module 232 crawls relevant sources to populate database 114. For example, when database 114 is a database of scholarly articles from a plurality of publishers, in some implementations, crawler module 232 crawls the websites of each of the plurality of publishers in order to add new scholarly articles to database 114. In some implementations, crawler module 232 performs a scheduled crawl based on publisher's respective publication schedules. Crawler 232 creates an item 214 for each scholarly article it discovers. In other implementations (e.g., implementations in which database 114 is a database of goods and services available from online vendors), the crawling is performed pseudo-randomly, or in response to predefined trigger events, such as events that correspond to updates of database 114.

Figure 3A:
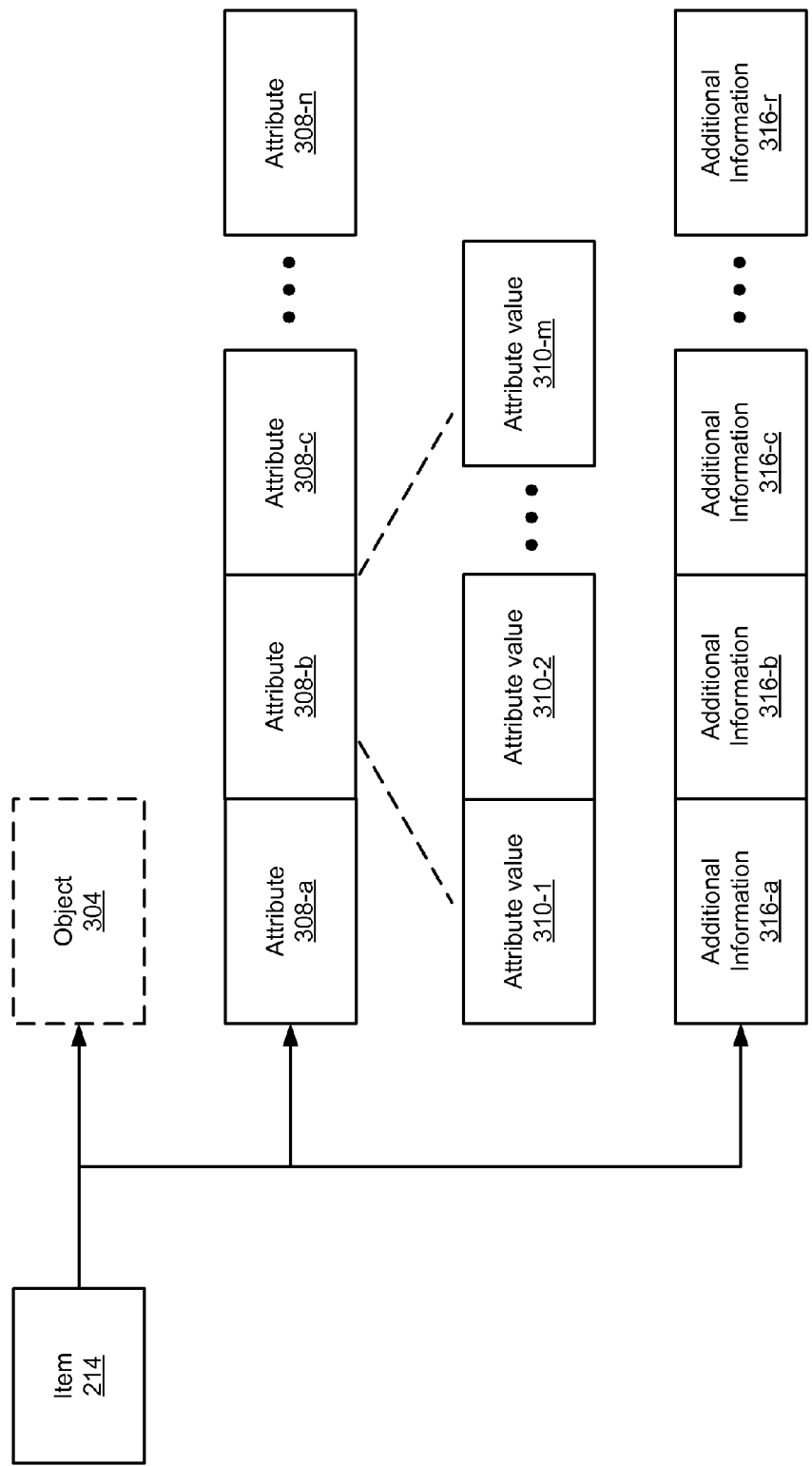
FIG. 3A illustrates a general example of a data structure for an item used in conjunction with a known item search, in accordance with some implementations.
Figure 3B:
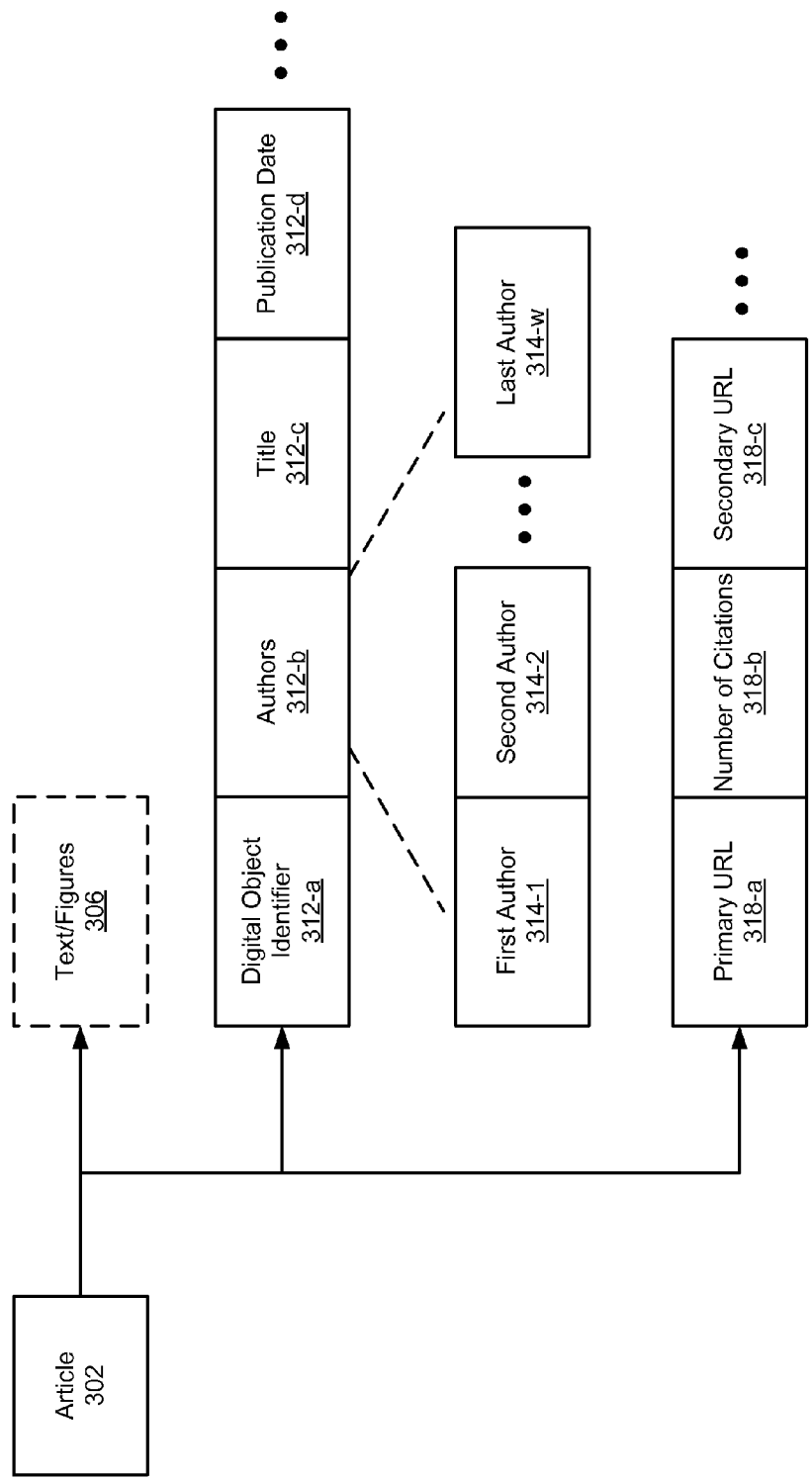
FIG. 3B illustrates a more specific example of a data structure for a scholarly article (e.g., an example of a type of item) used in conjunction with a known item search, in accordance with some implementations.

FIG. 3A illustrates a general example of a data structure for a respective item 214 used in conjunction with a known item search, in accordance with some implementations. FIG. 3B illustrates a more specific example of a data structure for a respective scholarly article 302 used in conjunction with a known item search, in accordance with some implementations. FIGS. 3A and 3B are discussed together below, as scholarly article 302 is an example of a type of item 214.

The data structure for item 214 (referred to hereinafter simply as "item 214") optionally includes object 304 (or a plurality of objects 304, for example, such as a plurality of song files when item 214 is a musical album). Object 304 is sometimes referred to as a content portion of item 214, while the remainder of item 214 is referred to as a metadata portion of item 214. For example, as shown in FIG. 3B, article 302 includes text/figures 306, which is the content of article 302. Text/figures 306 is optionally stored in item 214 as content in a portable document format (PDF), or as a combination of text files and/or image files. As two other examples, in various implementations, item 214 is a song and object 304 is an MP3 (MPEG-2 Audio Layer III) file and/or item 214 is a movie and object 304 is a MPEG-3 file.

In some circumstances, item 214 is an informational item corresponding to a physical item. For example, item 214 may be an informational item storing an online retailer's information about a NIKON™ COOLPIX L830 camera, including its price, color, megapixel count, etc. In these circumstances, item 214 does not include object 304 because the object (i.e., the camera) is physical rather than electronic in nature. In some circumstances, items corresponding to electronic objects may also forgo storage of the electronic object and instead store only information corresponding to the electronic object (e.g., if the electronic object is protected by copyright).

Item 214 further includes a plurality of attributes 308 (e.g., attribute 308-a, attribute 308-b, attribute 308-c, through attribute 308-n), each having one or more attributes values 310 (e.g., attribute 308-b has corresponding attribute value 310-1, attribute value 310-2, through attribute value 310-m). For example, as shown in FIG. 3B, article 302 includes digital object identifier (DOI) attribute 312-a, author attribute 312-b, title attribute 312-c, publication date attribute 312-d, etc.

In some implementations, certain attributes, such as digital object identifier (DOI) attribute 312-a, are restricted to having only a single value. (However, article 302 optionally includes other unique identifiers besides digital object identifier (DOI), such as an international standard book number (ISBN) or international standard recording code (ISRC) identifier.) Other attributes are permitted to have multiple values. For example, author attribute 312-b may have, depending on the circumstances, a first author value 314-1, a second author value 314-2, and continuing to a last author value 314-w, because there is, generally speaking, no limit to the number of authors a scholarly article may have.

In some implementations, item 214 includes a plurality of additional information fields 316 (e.g., additional information fields 316-a through additional information fields 316-r). These additional information fields optionally include information that is not necessarily an identifying attribute of item 214, but may nevertheless be useful to a client requesting a known item lookup. For example, as shown in FIG. 3B, article 302 includes primary universal resource locator (URL) 318-a, number of citations 318-b, secondary URL 318-c, etc. Each of these is an example of an additional information field. As described with reference to FIG. 4C, in some implementations, primary URL 318-a is a URL provided by the publisher who originally published article 302 in their journal, while secondary URL 318-c is a URL of an alternative website from which article 302 is available (e.g., sometimes a scientist who wrote an article will post the article on her own personal website). This way, the same article published on two different websites can be correlated by server system 111-a. Among other benefits, this provides a convenient data structure for tracking the number of times an article has been cited. It is also a convenient data structure for directing a reader, who may not have access to the publisher's content, to the same article published elsewhere, as described with reference to FIGS. 4C-4E.

In some implementations, additional information fields 316 include a play count field (e.g., indicating the number of times an online song and/or video has been played), a "liked" count field (e.g., indicating the number of users who have "liked" an online post, picture, video, song, article, etc.), product reviews, as well as other types of supplemental information.

FIG. 4A illustrates an example of a use case of a known item search, in accordance with some implementations. In particular, FIG. 4A illustrates how the implementations described herein are used, in some circumstances, to augment (e.g., supplement) information about a known item, even when the known item is erroneously requested. To that end, FIG. 4A makes use of an illustrative example in which the known item is a scholarly article published on a website, and the goal is to provide URL links 402 (e.g., URL links 402-a and 402-b) to the article.

To setup the example, consider a common situation: often, a group of scientists (or an individual scientist) will write and submit an article for publication in a publisher's journal. In the example shown in FIG. 4A, John S. Bell, a physicist, has written an article entitled "On the Problem of Hidden Variables in Quantum Mechanics," and submitted to the *Review of Modern Physics* for publication. Such articles will often include citations to other articles; the citations are typically appended in the submitted article in a text format (e.g., on paper, or in an electronic text or portable document format). These citations often include typographical errors. For example, John S. Bell's article "On the Problem of Hidden Variables in Quantum Mechanics" (hereinafter the "Bell" paper) cites another article, entitled "Can Quantum-Mechanical Description of Physical Reality Be Considered Complete?" by Einstein, Podolsky, and Rosen (herein referred to as the "EPR" paper). However, in this example, the citation for the EPR paper includes hypothetical error 404, namely, the EPR paper was published in volume 47 of *Physical Review* rather than volume 48.

It should be noted that, in some circumstances, the implementations described herein are also used to correct citation errors, such as hypothetical error 404, before the scholarly article, along with the citations, is published on the publisher's webpage. Thus, some implementations described herein obviate the need for tedious, by-hand, correction of citations by an editor of a journal. For explanatory reasons, however, hypothetical error 404 is included in the example.

FIG. 4B illustrates a graphical example a known item lookup request (e.g., submitted to and received by server system 111-a) and graphical examples of resulting candidate items, in accordance with some implementations. In particular, known item lookup request 406 is used, for example, by the publisher of the Bell paper, shown in FIG. 4A, to retrieve URL link 402-a to the EPR paper, which is cited by the Bell paper with hypothetical error 404.

Known item lookup request 406 is submitted to a server system (e.g., server system 111-a) that processes known item lookup request 406 and returns the known item. As an intermediate operation (described in greater detail with reference to FIGS. 6A-6D and/or FIG. 7) the server system determines attribute-value pairs for the known item, which, in some implementations, requires knowledge of two entities: (1) an attribute value, and (2) the attribute to which it corresponds. To that end, known item lookup request 406 includes one or more (or a plurality of) estimated attribute values, which are referred to as "estimated" because the attribute values may include inaccuracies (e.g., hypothetical error 404, FIG. 4A). Further, to ascertain the attribute corresponding to a respective attribute value, in some implementations, known item lookup request 406 also includes predefined structural lookup information (e.g., tags). For example, in FIG. 4B, predefined structural lookup information is shown in bold and includes, for example, author attribute indicator 410 and delimiter 412, which indicate to the server system that the text contained between author attribute indicator 410 and delimiter 412 is to be interpreted as an author name value.

In some implementations, as shown, the known item lookup request is a URL request. In some implementations, instructions are provided to the publisher telling the publisher how to construct the known item lookup request (e.g., such instructions are sometimes called a specification for the known item lookup request). For example, the specification for the known item lookup request states that the character string "author=" indicates that what follows is an author name value. Likewise, the character "&" delimits (e.g., marks a terminus of) the author name value.

FIG. 4B also illustrates two candidate items 408-*a* and 408-*b* resulting from known item lookup request 406. In some implementations, the server system processes the determined attribute-value pairs (e.g., by formulating a plurality of queries and executing one or more of the plurality of queries in accordance with a query type hierarchy) to identify candidate items 408-*a* and 408-*b* (e.g., in accordance with method 600, FIGS. 6A-6D, and/or method 700, FIG. 7). In some implementations, candidate items 408 are filtered by the server system in order to return the best candidate items 408 as the known item, which in this example is candidate items 408-*a*.

As a more specific example, in some implementations, the plurality of queries includes: (1) a first query based on a title attribute-value pair indicated by known item lookup request 406; and (2) a second query based on author attribute-value pairs and a publication date attribute-value pair indicated by known item lookup request 406. In accordance with the query type hierarchy (e.g., as shown and described with reference to FIG. 5), the server system executes the first query prior to executing the second query. The first query returns both candidate item 408-*a* and candidate item 408-*b* because they share the same title (i.e., "Can Quantum-Mechanical Description of Physical Reality Be Considered Complete?"). In some implementations, the server system filters candidate items 408 to produce the candidate item 408-*a* as the known item. This filtering is done, in some embodiments, by determining if certain attribute-value pairs for each respective candidate item 408 match, or fall within a predefined tolerance of, the corresponding estimated attribute-value pairs determined from known item lookup request 406. For example, because candidate item 408-*b* does not include any of the same authors indicated by known item lookup request 406, candidate item 408-*b* is eliminated as the known item. More generally, in accordance with a variety of implementations, such filters are constructed using any combination of attribute-value pairs for the candidate items. As another example, in some implementations, the estimated publication date has to be within 5 years of a candidate item's publication date.

Figure 4C:
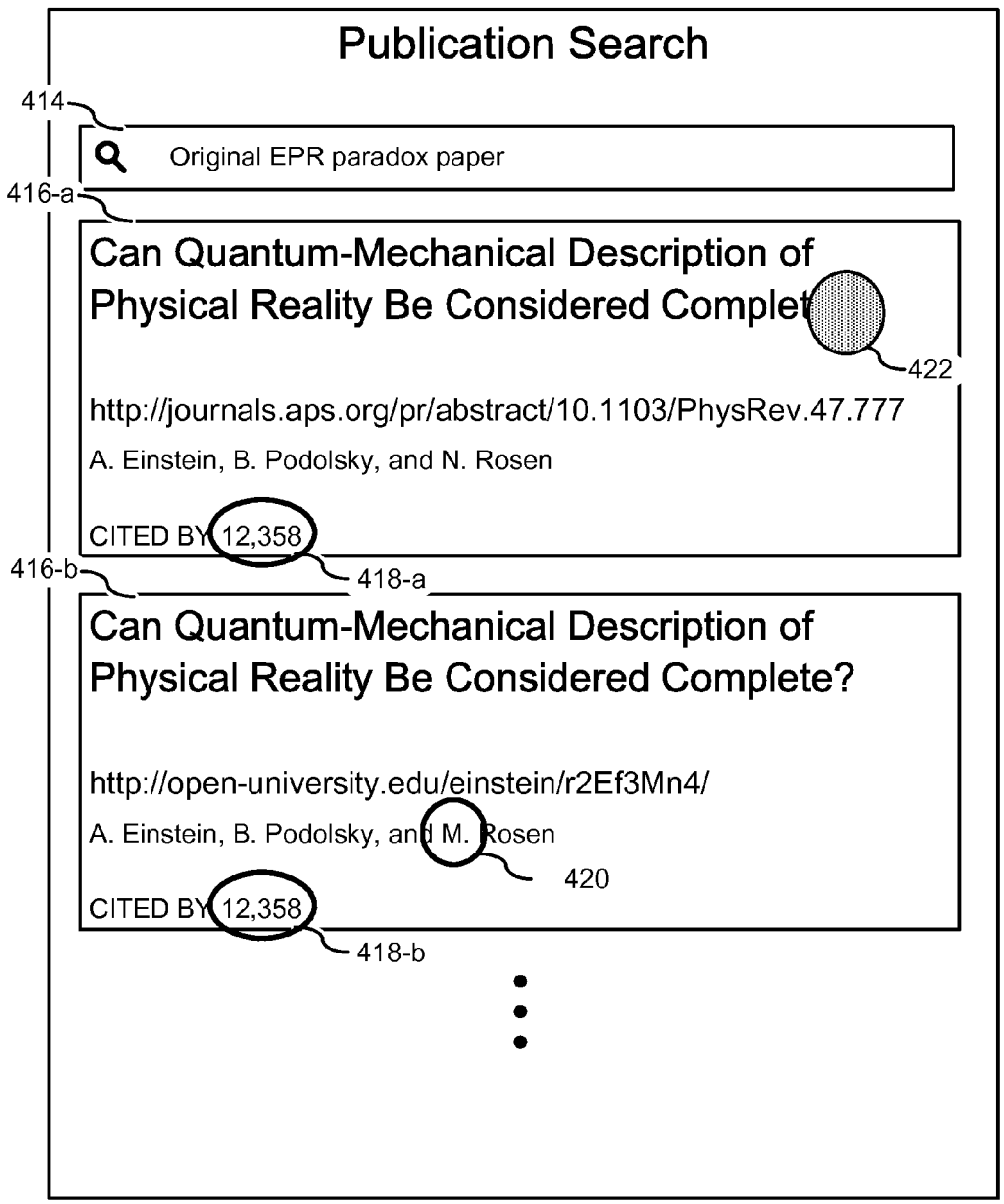
FIG. 4C illustrates another example of a use case of a known item search, in accordance with some implementations.

FIG. 4C illustrates another example of a use case of a known item search, in accordance with some implementations. In particular, FIG. 4C illustrates how the implementations described herein are used, in some circumstances, by a search engine to correlate information about a known item available from a plurality of sources (e.g., on the Internet). This correlation is achieved, in accordance with some implementations, even when information about the known item is erroneously reported by one of the sources. As was the case in the previous example, the known item in this example is a scholarly article, although one of skill in the art will appreciate that the known item may be a song, a video, information corresponding to an item offered by an online vendor (e.g., an informational item), etc. Further, the search engine in this example acts as a client by submitting a known item lookup request to a server system that catalogues scholarly articles published by publishers of journals (e.g., on the publisher's website).

To setup the example, consider a common situation: often, a search engine will crawl and index documents available through the Internet. Some of these documents may be distinct instances of the same scholarly article available from different sources on the Internet. Thus, when a user (e.g., a user of client device 108/110, FIG. 1) submits a search engine request (e.g., distinct from a known item lookup request), the search engine returns search results, a plurality of which may correspond to the same scholarly article. For example, FIG. 4C illustrates a user interface for a search engine in which a user has entered search 414 with the text "Original EPR paradox paper" (this is an example of a search engine search distinct from a known item search). In response, the search engine has returned search results 416-*a* and 416-*b*, which correspond to distinct instances of the same scholarly article (i.e., the EPR paper) available from different sources. Namely, search result 416-*a* indicates that an instance of the EPR paper is available from the original publisher's website (http://journals.aps.org/) and search result 416-*b* indicates that a different instance of the EPR paper is available from a different website (http://open-university.edu).

One goal of the use case shown in this example is to augment search results 416 to include information about the known item (e.g., rather than information about a distinct instance of the known item). Stated another way, in some implementations, documents which are instances of known items are correlated to the known items so that the information that is general to the known item, and not specific to an instance of the known item, is displayed in search results 416. As a more concrete example, both search results 416 include citation count 418 showing the number of times the EPR paper has been cited by other scholarly articles. Citation count 418 is a property of the EPR paper, and not a property of any particular instance of the EPR paper. In accordance with some implementations, this correlation is achieved despite the fact that the instance of the EPR paper available through http://open-university.edu includes hypothetical error 420 (the last author's first initial is "N" rather than "M").

To that end, in some implementations, by crawling the Internet, the search engine discovers documents that are potential scholarly articles (as well as other types of online documents). When the crawler discovers a potential scholarly article, the crawler indexes the document and determines (e.g., by parsing the document or examining metadata associated with the document), estimated attribute values. For example, the search engine downloads the instance of the EPR paper available through http://open-university.edu/ and determines that the title is "Can Quantum-Mechanical Description of Physical Reality Be Considered Complete?"

and that the authors are "A. Einstein"; "B. Podolsky"; and "M. Rosen" (the latter including hypothetical error 404, as noted above). The manner in which a search engine may determine (e.g., extract) estimated attribute values from an online document, such as a scholarly article, is beyond the focus of the present disclosure, but will nonetheless be apparent to one of ordinary skill in the art.

In some implementations, the search engine submits a known item lookup request to the server system (e.g., a known item lookup request analogous to that shown in FIG. 4B) based on the estimated attribute values obtained from online document. In some implementations, the server system performs a known item lookup (e.g., in accordance with method 600, FIGS. 6A-6D, and/or method 700, FIG. 7). When a result is obtained, the server system returns a data structure (e.g., the data structure shown in FIG. 3B, or a subset thereof) that includes information corresponding to a number of citations of the known item, which is then used by the search engine to display citation count 418-*b*. In an analogous manner, when the search engine submits a known item lookup request based on crawling the instance of the EPR paper available from http://journals.aps.org/, the server system will return the same data structure (e.g., because it is the same paper), which is used by the search engine to display citation count 418-*a* (which is the same citation count as citation count 418-*b*). In this manner, the two instances of the EPR paper are correlated.

In addition, in some implementations, the known item lookup request provided by the search engine includes a URL of the location from which the document was downloaded. In some implementations, when the known item lookup request matches a known item, the server system determines whether the URL is a known source for the known item. If the URL is not a known source for the known item, the server system appends the known item with the URL (e.g., as a secondary URL, as shown in FIG. 3B).

In some circumstances, a user may not have digital access rights to a publisher's content that includes a respective scholarly article. However, the scholarly article may be freely available elsewhere on the Internet. To that end, another goal of the use case shown in this example is to use the correlation of two (or more) instances of a scholarly article to direct a user (e.g., a user of client device 108/110) to an instance of the scholarly article that the user has access to. To that end, FIG. 4C illustrates selection of a respective instance of the EPR paper via user input 422. It is assumed, for the sake of this example, that the user does not have access to the content provided by http://journals.aps.org/. Collectively, FIGS. 4C-4E illustrate an example of how the user is directed, in accordance with some implementations, to the instance of the EPR paper provided by http://open-university.edu/, which the user is assumed to have access to.

Figure 4D:
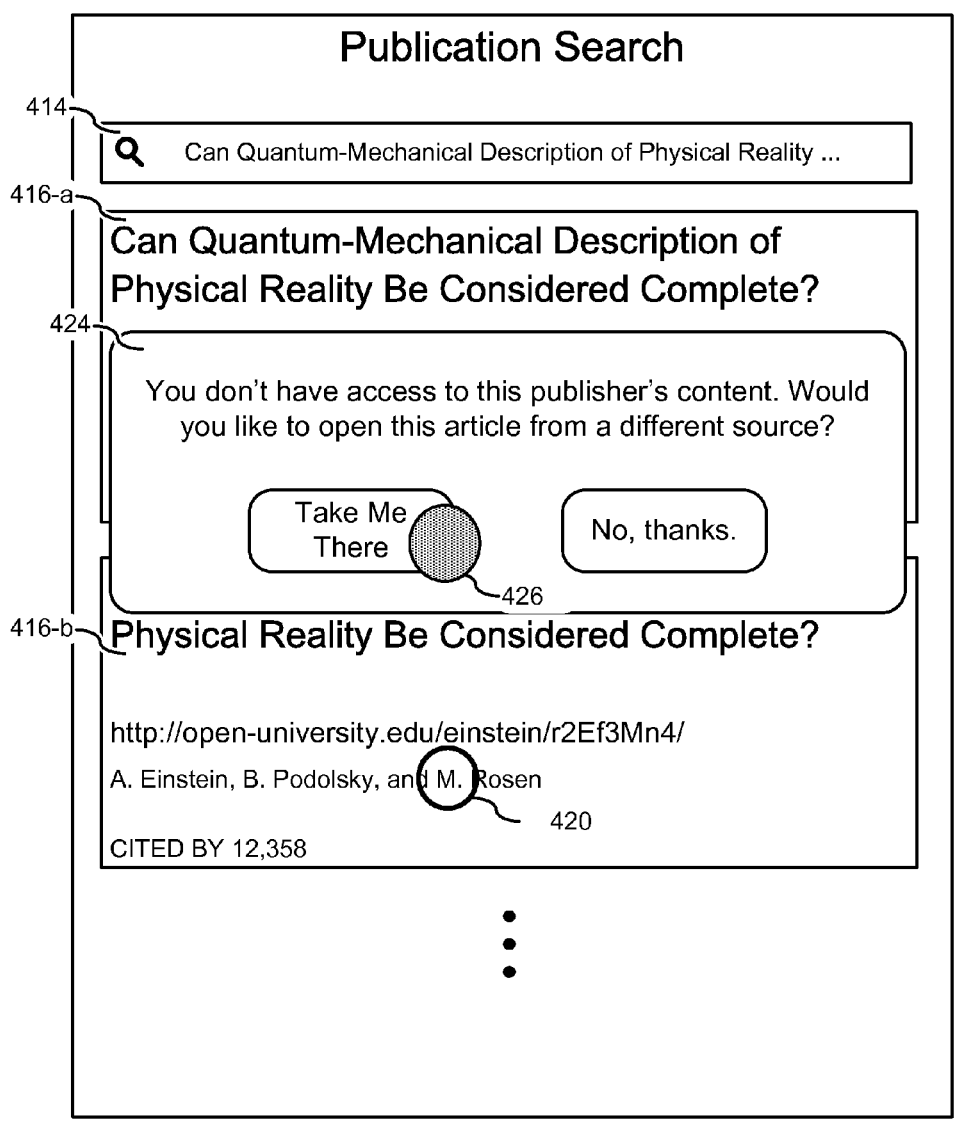
FIG. 4D illustrates a continuation of the use case of a known item search shown in FIG. 4C, in accordance with some implementations.

FIG. 4D illustrates a continuation of the use case of a known item search shown in FIG. 4C, in accordance with some implementations. In response to user input 422, the search engine determines that the user does not have access to the publisher's content, and produces user interface 424 asking if the user would like to be taken to a different instance of the same scholarly article (e.g., by asking the user "Would you like to open this article from a different source?"). When the user enters user input 426 ("Take Me There") indicating that she would like to be taken to a different instance of the same scholarly article, the search engine submits a known item lookup request to the server system (or, alternatively, uses the result of a previous known item lookup request) and obtains a secondary URL (e.g., stored in secondary URL 318-*c*, FIG. 3B) through which the user has access to the scholarly article (e.g., in this case, the user has access to the scholarly article through http://open-university.edu/).

FIG. 4E illustrates a continuation of the use case of a known item search shown in FIG. 4D, in accordance with some implementations. In response to user input 426 and the known item lookup request returning secondary URL 428 through which the user has access to the scholarly article, the user is directed to secondary URL 428, so that the article is displayed to the user.

One of ordinary skill in the art will appreciate that analogous implementations for other types of known items are apparent and fall within the scope of the appended claims. For example, when the known item is an item available for sale from a plurality of online vendors (e.g., a NIKON™ COOLPIX L830 camera) some implementations use correlated instances of the same known item to direct the user to the vendor offering the lowest price for the known item, even when certain attribute values of the known item are erroneously recorded on one or more of the online vendors websites.

Figure 5:
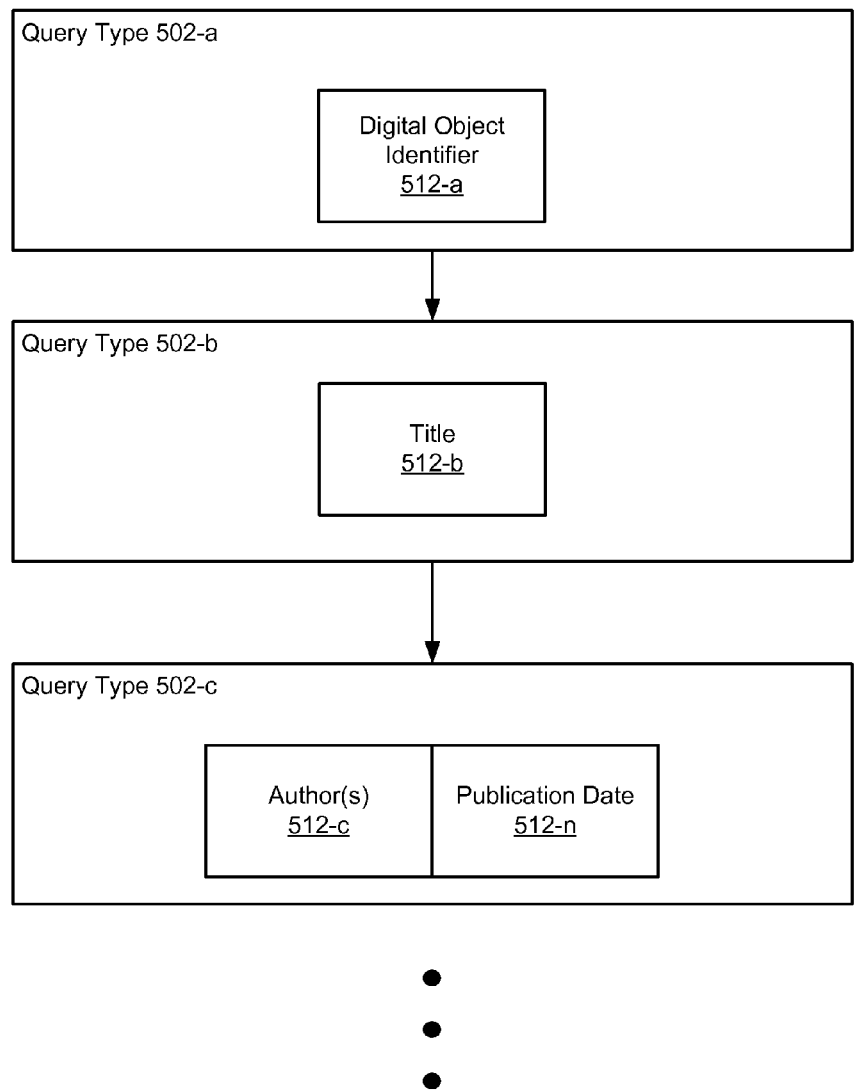
FIG. 5 illustrates a graphical example of a query type hierarchy, in accordance with some implementations.
Figure 6A:
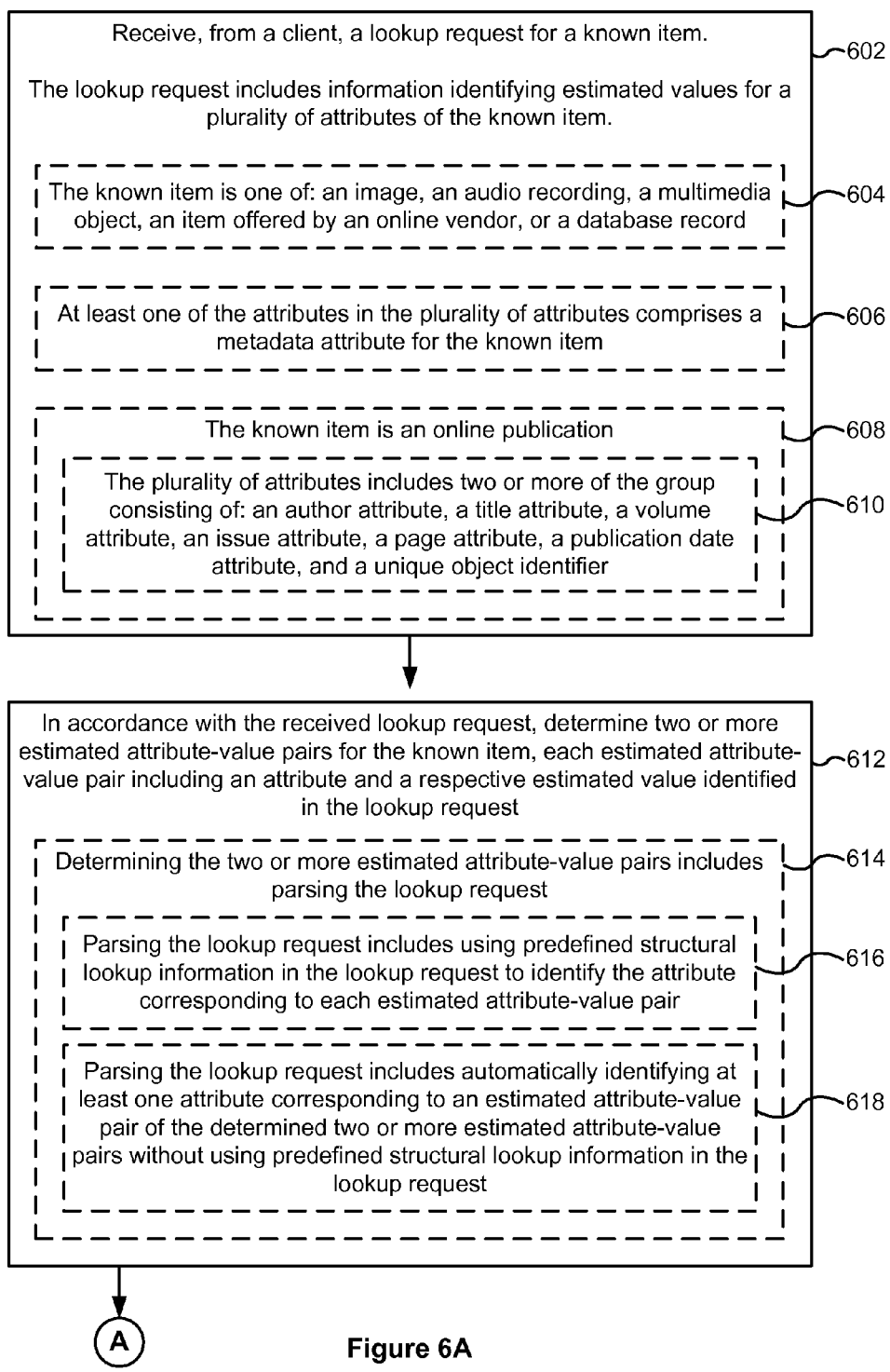
FIGS. 6A-6D illustrate a flowchart of a method for known item searching, in accordance with some implementations.
Figure 6B:
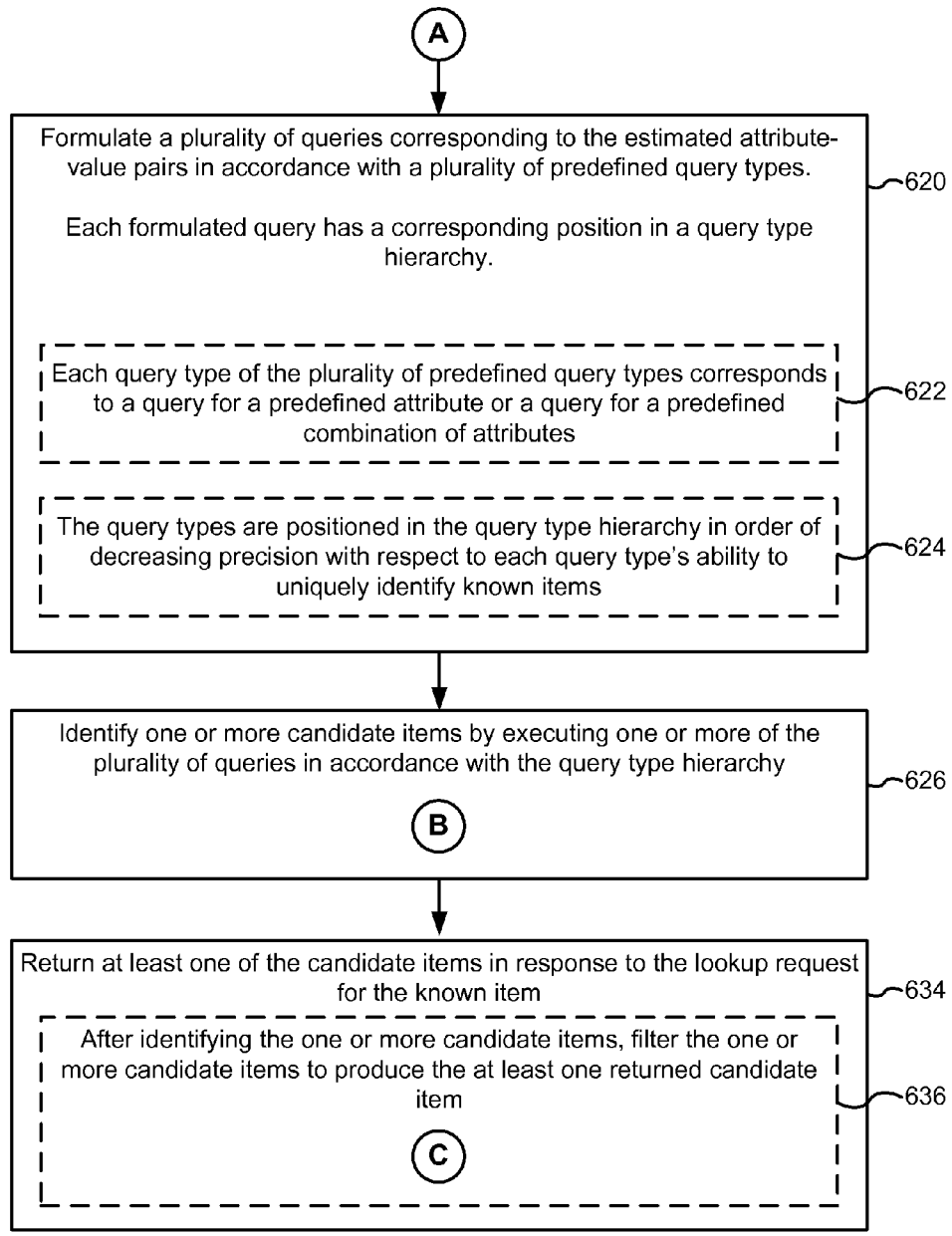
Figure 6C:
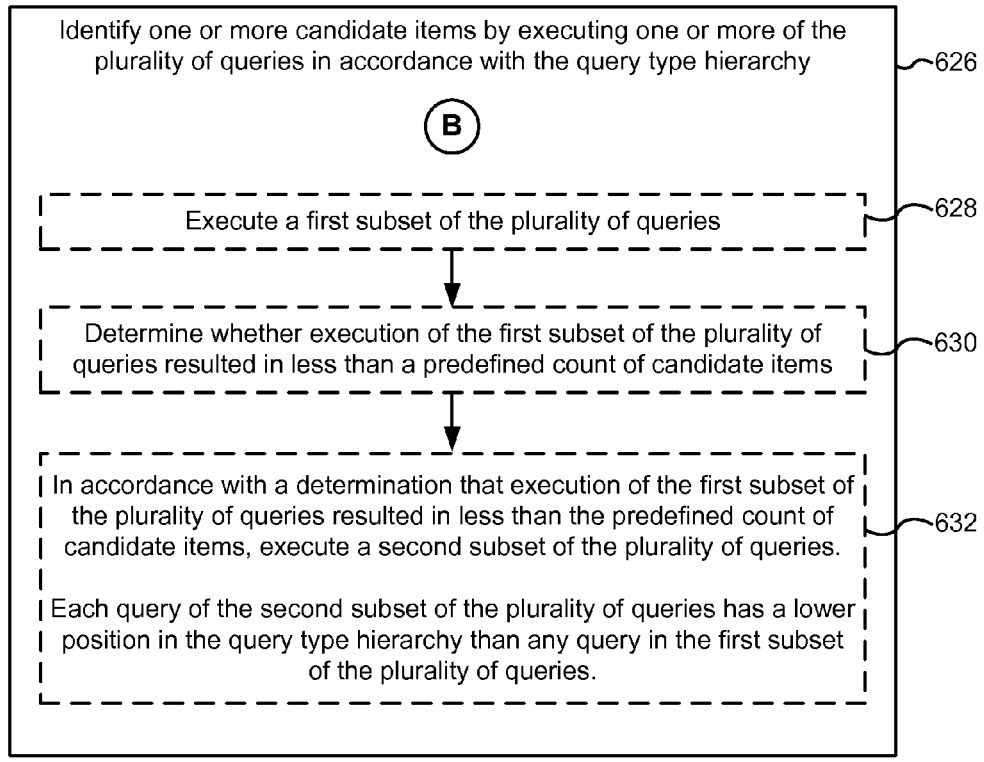
Figure 6D:
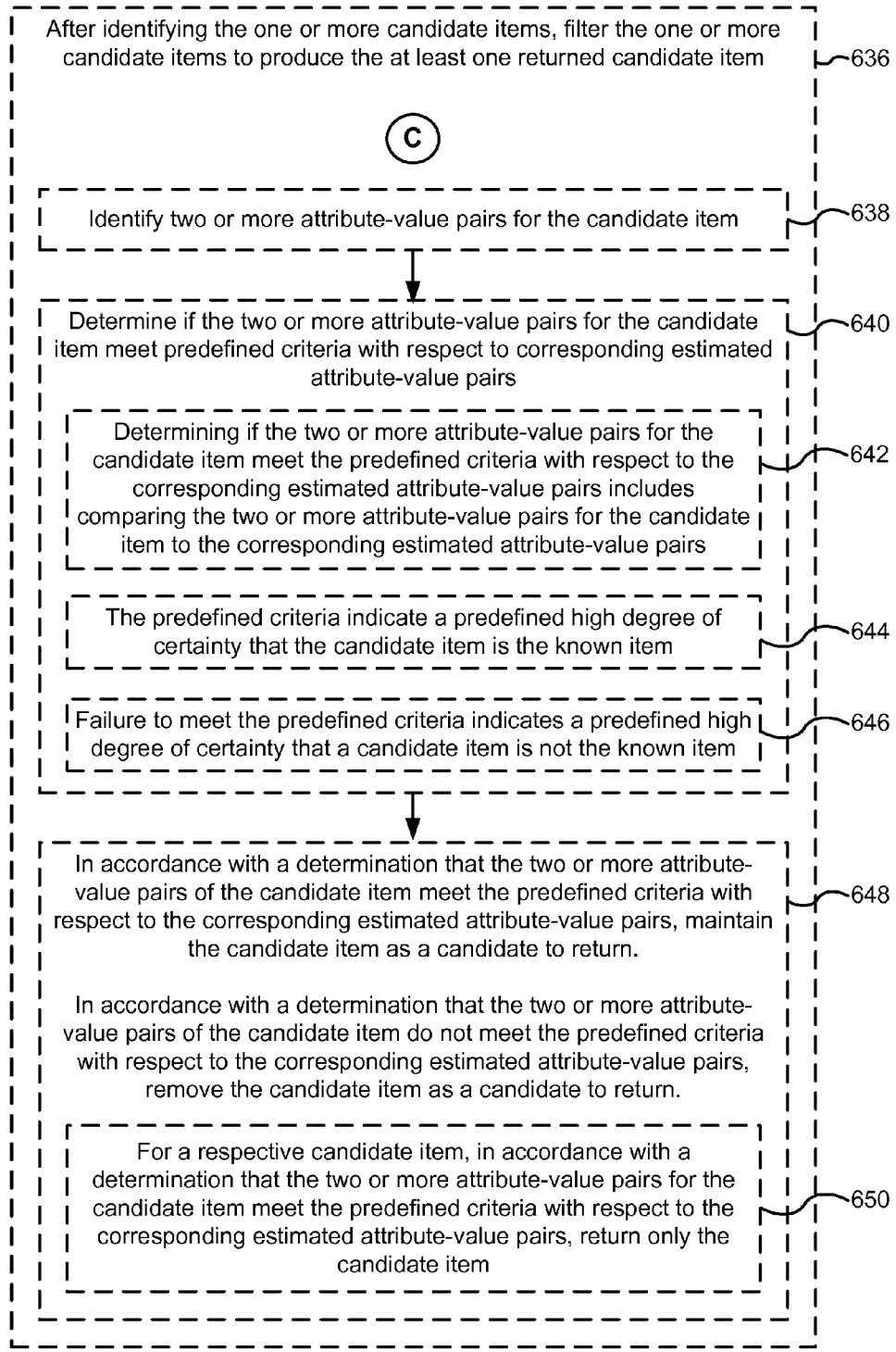

FIG. 5 illustrates a graphical example of query type hierarchy 500, in accordance with some implementations. Query type hierarchy 500 includes a plurality of query types 502 (e.g., query type 502-*a*, 502-*b*, and 502-*c*) ranked in an order. In some implementations, the order indicates the precision with which queries of the query type uniquely (e.g., precisely) identify a known item.

In some implementations, when a server system (e.g., server system 111-*a*) receives a known item lookup request that includes estimated attribute values, the server system formulates a plurality of queries corresponding to the estimated attribute values (e.g., by constructing estimated attribute-value pairs). The formulated queries are each of a respective query type 502 included in the query type hierarchy 500. The server system identifies one or more candidate items by executing one or more of the plurality of queries in accordance with query type hierarchy 500.

For example, again considering implementations in which the known item is a scholarly article, an accurate digital object identifier (DOI) 512-*a* identifies known items with a high degree of precision. Thus, if present in a known item lookup request, the server system executes a query based on an estimated DOI 512-*a*. When a result is returned, the server system optionally filters the result based on consistency with other attribute values expressed in the known item lookup request. When the known item lookup request does not include an estimated DOI 512-*a*, or when the result of the query based on an estimated DOI 512-*a* fails the filtering, in some implementations, the server system executes a query based on an estimated title 512-*b* of the known item. An accurate title 512-*b* identifies a known item less precisely than an accurate DOI 512-*a*, and is thus lower on the hierarchy. When the query based on the estimated title 512-*b* fails, either because it fails to return a result or the returned results fail subsequent filtering, the server system executes a query based on estimated author names 512-*c* and publication date 512-*n*, which is still less precise than the query based on title 512-*b*.

Further details about how query type hierarchy 500 is used, in accordance with some implementations, are provided with reference to method 600 (described with reference to FIGS. 6A-6D) and method 700 (described with reference to FIG. 7).

FIGS. 6A-6D illustrate a flowchart of method 600 for known item searching, in accordance with some implementations. In particular, method 600 provides a robust manner with which to perform a known item lookup, even when the known item lookup is based on a known item lookup request that includes flawed and/or erroneous information. In some implementations, method 600 is performed at a server system (e.g., server system 111-*a*, FIG. 1). In some implementations, various operations performed with reference to method 600 can be distributed across multiple servers or multiple server systems. For ease of explanation, method 600 is described with reference to a single server system. Also, in some implementations, operations shown in separate figures (e.g., FIGS. 6A-6D and FIG. 7) and/or discussed in association with separate methods (e.g., method 700) may be combined to form other methods, and operations shown in the same figure and/or discussed in association with the same method may be separated into different methods.

A server system receives (602) a lookup request for a known item (e.g., a known item lookup request). The lookup request includes information identifying estimated values for a plurality of attributes of the known item. In some implementations, the lookup request is received from a client (e.g., over communication network 106, FIG. 1). As used herein, the term "client" refers to a component of computer hardware or software that accesses a service made available by the server system. Thus, in some circumstances, the client is another server system. In some circumstances, the lookup request is received by a first module on the server system and the client is a second module, distinct from the first module, on the server system (e.g., the second module is another server computer or another software module). In some implementations, the client is a search engine server system. In some implementations, the client is a portable multifunction device (e.g., client device 108/110, FIG. 1).

In some implementations, the lookup request is a request for a single known item (e.g., a single result). For example, in various implementations, the known item is (604) one of: an image, an audio recording, a multimedia object, an item offered by an online vendor, or a database record. In some circumstances, the item is an informational item corresponding to a physical item offered by an online vendor. Consider an example in which the client is a website that helps consumers find the best price on specific goods and services. A user of the website (e.g., using client device 108/110) may request, from the website, prices for a NIKON™ COOLPIX L830 camera from a plurality of online retailers. In response, in this example, the website submits a lookup requests for the known item (i.e., the NIKON™ COOLPIX L830) to the server system, which is assumed in this example to be an online retailer of the plurality of online retailers. The server system performs a known item search in accordance with method 600 and returns an informational item that includes the online retailer's price for the NIKON™ COOLPIX L830. By submitting such a request to each of the plurality of online retailers (e.g., each of whom independently perform a known item search in accordance with method 600), the website can obtain prices from each of the plurality of online retailers, even if the user of the website has, for example, misspelled the name of the known item.

In some implementations, at least one of the attributes in the plurality of attributes comprises (606) a metadata attribute for the known item. In some implementations, the item includes content (e.g., object 304, FIG. 3A) and metadata (e.g., everything other than object 304, FIG. 3A) storing attribute values for at least one attribute. For example, when the item is a song, in some circumstances, the item includes a media file storing the song as well as metadata indicating known attribute values for attributes such as the name of the performers, the name of the album, the year the song was released, etc. In some implementations, the server system attempts to match the estimated values for the plurality of attributes to corresponding known values for the same plurality of attributes stored in the metadata. The process of matching the estimated value for the plurality of attributes to the known values for the same plurality of attributes is described in greater detail below.

In some implementations, the known item is (608) an online publication (e.g., such as a scholarly article). In some implementations, the server system stores a plurality of online publications (or a plurality of informational items corresponding to online publications) in a suitable data structure (e.g., the data structure shown in FIG. 3B) including known attribute values corresponding to the estimated attribute values included in the lookup request. In some implementations, when the known item is an online publication, the plurality of attributes (e.g., for which estimated attribute values are included in the lookup request) includes (610) two or more of the group consisting of: an author attribute (e.g., having a plurality of estimated values, each corresponding to an estimated author name), a title attribute (e.g., having a single value indicating an estimated title, or alternatively having a plurality of values, each corresponding to a distinct term of an estimated title), a volume attribute (e.g., having a single value indicating an estimated volume number), an issue attribute (e.g., having a single value indicating an estimated issue number), a page attribute (e.g., having a single value indicating an estimated starting page number, or a pair of values indicating an estimated starting page number and an estimated ending page number), a publication date attribute (e.g., having one or more values indicating a publication year or a publication day), and a unique object identifier (e.g., having an estimated DOI value and/or an estimated ISBN value).

In accordance with the received lookup request, the server system determines (612) two or more estimated attribute-value pairs for the known item, each estimated attribute-value pair including an attribute and a respective estimated value identified in the lookup request. Stated another way, in some implementations, the server system matches each (or at least two of) the estimated values for the plurality of attributes to their corresponding attributes. For example, when the lookup request includes an estimated publication year of 1935, the server system matches the estimated value to the attribute "publication year" to form an estimated attribute-value pair that is, in some circumstances, expressed as "publication year: 1935".

In some implementations, determining the two or more estimated attribute-value pairs includes parsing (614) the lookup request. For example, in some implementations, parsing the lookup request includes (616) using predefined structural lookup information (e.g., tags) in the lookup request to identify the attribute corresponding to each estimated attribute-value pair (e.g., as described with reference to FIG. 4B).

Alternatively, in some implementations, the lookup request is unstructured (e.g., without structural tags). For example, the lookup request is a character string 'A. Einstein, B. Podolsky, N. Rosen, "Can Quantum-Mechanical Description of Physical Reality Be Considered Complete?" Phys. Rev. 48, 777 (1935)'. Stated another way, in some implementations, for example when the known item is a scholarly article, the lookup request is a character string of the citation to the scholarly article. To that end, in some implementations, parsing the lookup request includes (618) automatically identifying at least one attribute corresponding to an estimated attribute-value pair of the determined two or more estimated attribute-value pairs without using predefined structural lookup information in the lookup request. Despite the fact that the lookup request is, in some implementations, unstructured in the sense that it does not include predefined structural lookup information, some types of lookup requests, such as citations for scholarly articles, have an expected format (e.g., the citation is expected to be in a modern language association (MLA) format). For example, the MLA format for citing a scholarly article is given by the citation format:

<Author 1, Author 2, . . . , Author n> <"Title of Article"> <Title of Journal> <Volume>.<Issue> <(Year)>: <pages>

Therefore, in some implementations, the server system interprets the unstructured lookup request in accordance with an expected format. Using the MLA format above as an example, the server system interprets the character string lookup request 'A. Einstein, B. Podolsky, N. Rosen, "Can Quantum-Mechanical Description of Physical Reality Be Considered Complete?" Phys. Rev. 48, 777 (1935)' by interpreting the characters in between the quotation marks as an estimated title attribute value (e.g., by assigning said characters as a value corresponding to a title attribute to form a title attribute-value pair), interprets anything to the left of the title as a sequence of estimated author values separated by commas, interprets anything between the parentheses as an estimated publication date value (e.g., indicating a publication year), interprets a first number separated by a period from a second number by assigning the first number as an estimated volume number attribute and assigning the second number as an estimated issue number attribute, and so on. In some implementations, the server systems bootstraps off of determined estimated attribute values, e.g., by first determining that "Einstein" is an author name, and then determining a title attribute value in accordance with a list of Einstein's publications.

In some implementations, automatically identifying at least one attribute corresponding to an estimated attribute-value pair includes tokenizing the unstructured lookup request (e.g., in 5 character overlapping tokens) and searching for known items having matching tokens in their respective attribute values (e.g., searching a set of scholarly publications for any publication that has a token "Einst" appearing in the author attributes or title attributes), and then bootstrapping off of the results.

Returning to the flowchart for method 600, the server system formulates (620) a plurality of queries corresponding to the estimated attribute-value pairs in accordance with a plurality of predefined query types. Each formulated query has a corresponding position in a query type hierarchy. In some implementations, the server system formulates queries based on as many of the query types shown in query type hierarchy 500 (FIG. 5) as possible given the estimated attribute-value pairs. For example, if a lookup request includes an estimated DOI 512-*a*, the server system formulates a query based on query type 502-*a*. On the other hand, if a lookup request does not include an estimated digital object identifier (DOI) 512-*a*, then the server system will not be able to construct a query based on query type 502-*a*.

In some implementations, the server system first formulates only a single query (e.g., a query of the highest rank type possible according to the query type hierarchy), attempts to identify the known item using the single query (e.g., in accordance with operations 626-650, described below), and when the single query fails to return a suitable candidate as the known item, formulates a second query and repeats the process. Stated another way, in some implementations, the server system need not formulate more than one query before moving on to operation 626, but in some circumstances will nevertheless formulate a plurality of queries before a suitable known item is returned to the client (operation 634).

In some implementations, each query type of the plurality of predefined query types corresponds to (622) a query for a predefined attribute or a query for a predefined combination of attributes. For example, query type hierarchy 500 (FIG. 5) illustrates query type 502-*a* corresponding to a predefined attribute (e.g., DOI 512-*a*) and query type 502-*c* corresponds to a predefined combination of attributes (e.g., author 512-*c* and publication date 512-*n*). In some implementations, a query of a predefined query type will include estimated attribute values for each attribute in the predefined query type, and will match an item when all of the estimated attribute values in the query match the corresponding known attribute values for the item, or fall within a predefined range of the corresponding known attribute values for the item (e.g., ±5 years for a publication date attribute). Stated another way, in some implementations, the query type specifies an "AND" relationship between attributes. Alternatively, in some implementations, a query of a predefined query type will match an item when any of the estimated attribute values in the query match the corresponding known attribute values for the item, or fall within a predefined range of the corresponding known attribute values for the item (e.g., ±5 years for a publication date attribute). Stated another way, in some implementations, the query type specifies an "OR" relationship between attributes. More generally, in some implementations, a query type specifies a combination of "AND", "OR", and "XOR" relationships between attributes (or relationships using any other logical operator).

In some implementations, the query types are positioned (624) in the query type hierarchy in order of decreasing precision with respect to each query type's ability to uniquely identify known items. Further details regarding query type hierarchies constructed in accordance with decreasing query type precision are given by way of example in the following.

The server system identifies (626) one or more candidate items by executing one or more of the plurality of queries in accordance with the query type hierarchy (e.g., by searching a database for data structures with known attribute values matching the estimated attribute values). In some implementations, execution of each query is precise, meaning the candidate items are items that are an exact match to a respective query of the plurality of queries. However, because a plurality of queries is formulated from the lookup request, inaccuracy in an estimated attribute value is likely to be excluded from at least one of the queries. Therefore, the likelihood is increased that the known item is returned as a candidate item by at least one of the queries in the plurality of queries, as compared to methods which require a precise match to all attribute value information that is provided in a lookup request.

More specifically, in some implementations, in order to identify the one or more candidate items, the server system executes (628) a first subset of the plurality of queries (e.g., the first subset includes a single query or a plurality of queries). The server system determines (630) whether execution of the first subset of the plurality of queries resulted in less than a predefined count of candidate items (e.g., the predefined count is one, or an integer greater than one, such as two). In accordance with a determination that execution of the first subset of the plurality of queries resulted in less than the predefined count of candidate items, the server system executes (632) a second subset of the plurality of queries (e.g., the second subset includes a single query or a plurality of queries). Each query of the second subset of the plurality of queries has a lower position in the query type hierarchy than any query in the first subset of the plurality of queries.

Considering, as an example, implementations in which the known item is a scholarly article, an accurate digital object identifier (DOI) identifies known items with a high degree of precision. Thus, if present in a known item lookup request, the server system executes a query based on an estimated DOI. This is an example of execution of a first subset of a plurality of queries, where the first subset is a single query. When no results are returned, the server system executes another query, for example a query based on an estimated title of the known item. This is an example of execution of a second subset of a plurality of queries, where the second subset is a single query. An accurate title identifies a unique known item less precisely than an accurate DOI, and is thus lower on the hierarchy. In some implementations, the server system continues in this manner until the known item is found (e.g., in accordance with the remainder of method 600), or the server system exhausts the possible queries based on the lookup request (e.g., in accordance with the query type hierarchy).

The server system returns (634) (e.g., to the client), at least one of the candidate items in response to the lookup request for the known item. In some implementations, when a single candidate item is determined to be the known item with a high degree of certainty (e.g., having a certainty metric above a predefined threshold) that single candidate item is the sole returned candidate item. In some implementations, when no single candidate item can be determined to be the known item, a plurality of candidate items is returned. In some implementations, when a candidate item is determined to be the known item, the known item is updated (using a data structure, as shown in FIG. 3), based on the lookup request (e.g., to correlate instances of the known item available through a plurality of sources, as explained with reference to FIGS. 4A-4E).

In some implementations, after identifying the one or more candidate items, the server system filters (636) the one or more candidate items to produce the at least one returned candidate item. In some implementations, to filter the one or more candidate items, the server system performs some or all of operations 638-650.

In particular, in some implementations, the server system identifies (638) two or more attribute-value pairs for the candidate item. Considering, as an example, implementations in which the known item is a scholarly article, an accurate digital object identifier (DOI) identifies known items with a high degree of precision. Thus, if present in a known item lookup request, the server system executes a query based on an estimated DOI and identifies a candidate item. The server system also identifies a title attribute-value pair and a publication date attribute-value pair.

The server system determines (640) if the two or more attribute-value pairs for the candidate item meet predefined criteria with respect to corresponding estimated attribute-value pairs. In some implementations, determining if the two or more attribute-value pairs for the candidate item meet the predefined criteria with respect to the corresponding estimated attribute-value pairs includes (642) comparing the two or more attribute-value pairs for the candidate item to the corresponding estimated attribute-value pairs. Continuing the example above, after identifying a candidate item based on a DOI number, the server system compares the candidate item's authors to determine if the estimated authors share at least one author in common, and compares the candidate item's publication date to determine if it is within five years of the estimated publication date.

In some implementations, the predefined criteria indicate (644) a predefined high degree of certainty (e.g., 90% certainty or 95% certainty) that the candidate item is the known item. For example, when a candidate item is identified based on DOI number, an identical author list indicates a high degree of certainty that the candidate item is the known item. Alternatively, in some implementations, failure to meet the predefined criteria indicates (646) a predefined high degree of certainty that a candidate item is not the known item. For example, when a candidate item is identified based on DOI number, but shares no authors in common with estimated authors in the lookup request, it is highly unlikely that the candidate item is the known item; it is more likely that the DOI number was erroneously entered in the lookup request.

In accordance with a determination that the two or more attribute-value pairs of the candidate item meet the predefined criteria with respect to the corresponding estimated attribute-value pairs, the server system maintains (648) the candidate item as a candidate to return (e.g., to the client). In accordance with a determination that the two or more attribute-value pairs of the candidate item do not meet the predefined criteria with respect to the corresponding estimated attribute-value pairs, the server system removes the candidate item as a candidate to return to the client. In some implementations, for a respective candidate item, in accordance with a determination that the two or more attribute-value pairs for the candidate item meet the predefined criteria with respect to the corresponding estimated attribute-value pairs, the server system returns only the candidate item (e.g., when the predefined criteria indicate the predefined high degree of certainty that the candidate item is the known item).

Figure 7:
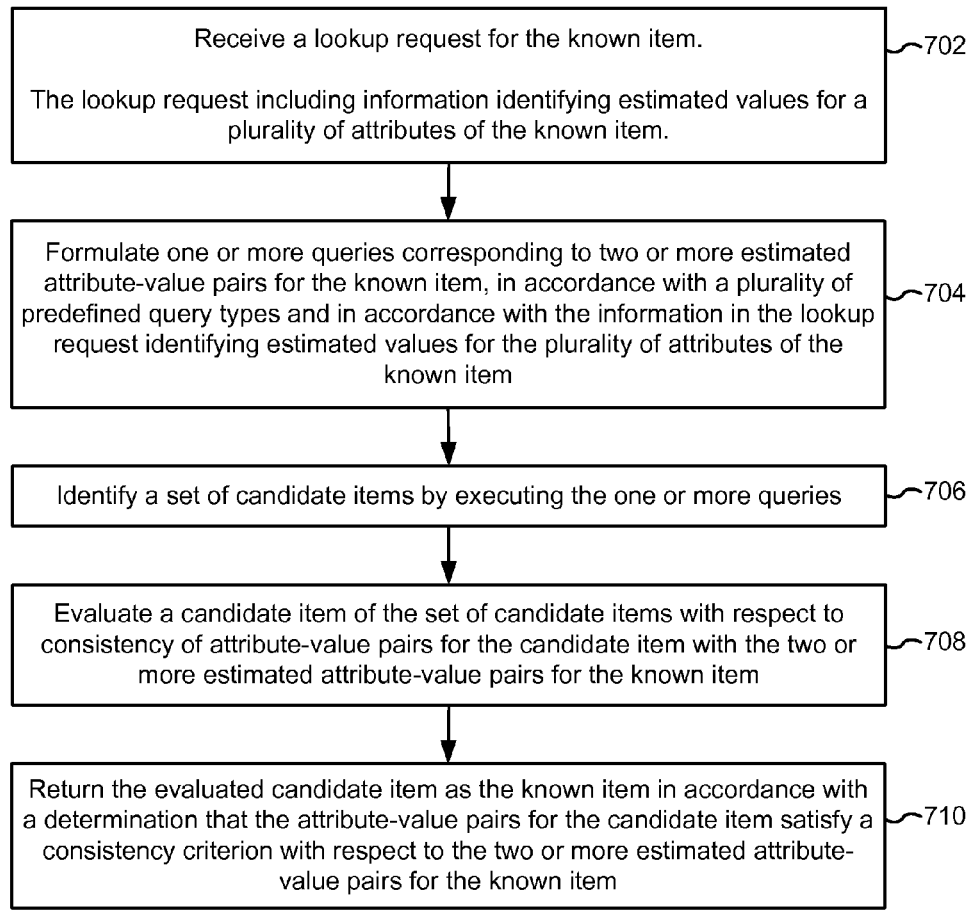
FIG. 7 illustrates a flowchart of another method for known item searching, in accordance with some implementations.

FIG. 7 illustrate a flowchart of method 700 for known item searching, in accordance with some implementations. In particular, method 700 provides a robust manner with which to perform a known item lookup, even when the known item lookup is based on a known item lookup request that includes flawed and/or erroneous information. In some implementations, method 700 is performed at a server system (e.g., server system 111-*a*, FIG. 1). In some implementations, various operations performed with reference to method 700 can be distributed across multiple servers or multiple servers systems. For ease of explanation, method 700 is described with reference to a single server system. Also, in some implementations, operations shown in separate figures (e.g., FIGS. 6A-6D, and FIG. 7) and/or discussed in association with separate methods (e.g., method 600) may be combined to form other methods, and operations shown in the same figure and/or discussed in association with the same method may be separated into different methods.

The server system receives (702) a lookup request for the known item (e.g., from a client). The lookup request including information identifying estimated values for a plurality of attributes of the known item. This operation is analogous to operation 602, described with reference to method 600 (FIGS. 6A-6D). Therefore, for the sake of brevity, these details are not repeated.

The server system formulates (704) one or more queries corresponding to two or more estimated attribute-value pairs for the known item, in accordance with a plurality of predefined query types and in accordance with the information in the lookup request identifying estimated values for the plurality of attributes of the known item. In some implementations, the server system determines the two or more estimated attribute-value pairs for the known item in accordance with the received lookup request, as described with reference to operation 612 of method 600.

As an example, in some circumstances, the lookup request includes information identifying a first estimated value for a first attribute, a second estimated value for a second attribute, a third estimated value for a third attribute, and a fourth estimated value for a fourth attribute. While a conventional method will often create a single query using each of the first through fourth estimated values in a precise manner (e.g., requiring exact matching of each value), in some implementations, the server system formulates three queries: for example, a first query based solely on the first value, a second query based on a combination of the second and third value, and a third query based on a combination of the third and fourth value. Thus, if the second value includes an inaccuracy, the first and third queries will be robust to the inaccuracy and potentially return the known item as a candidate item as described below. In contrast, a conventional method that requires precise matching of all values will return a search miss.

The server system identifies (706) a set of candidate items by executing the one or more queries. In some implementations, all of the one or more queries are executed together (e.g., simultaneously, or, alternatively, serially but before further processing of the candidate items). In some implementations, the set of candidate items is a combination of the results of executing the one or more queries. In some implementations, the set of candidate items is the union of the results of executing the one or more queries.

The server system evaluates (708) a candidate item of the set of candidate items with respect to consistency of attribute-value pairs for the candidate item with the two or more estimated attribute-value pairs for the known item. For example, when the known lookup request includes a DOI number and an author list (e.g., for a scholarly article, which in this example is the known item), in some implementations, the server system identifies a candidate item by executing a query based solely on the DOI number. As noted above, the server system may also identify other candidate items using the same or other queries, but for simplicity, operation 708 is described with respect to a single candidate item. To that end, in some implementations, the server system evaluates the candidate item with respect to the author list provided in the lookup request, for example, to determine if all of the authors match (or, alternatively, at least one of the authors match, or some other consistency criterion).

The server system returns (710) the evaluated candidate item as the known item in accordance with a determination that the attribute-value pairs for the candidate item satisfy a consistency criterion with respect to the two or more estimated attribute-value pairs for the known item. Thus, in some implementations, when a query returns a candidate item that is sufficiently consistent with remaining estimated attribute values provided by the lookup request (e.g., as defined by the consistency criterion), the server system determines that the candidate item is the correct known item and returns it (e.g., to the client).

The foregoing description, for the purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will be understood that, although the terms "first," "second," etc. may be used herein to describe various elements, these elements should not be limited by these terms. These terms are only used to distinguish one element from another. For example, a first item could be termed a second item, and, similarly, a second item could be termed a first item, without changing the meaning of the description, so long as all occurrences of the "first item" are renamed consistently and all occurrences of the "second item" are renamed consistently. The first item and the items are both items, but they are not the same item.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A computer-implemented method of searching for a known item, comprising:
   at a server system:
   receiving a lookup request for the known item, the lookup request including information identifying estimated values for a plurality of attributes of the known item;
   in accordance with the received lookup request:
   determining two or more estimated attribute-value pairs for the known item, each estimated attribute-value pair including an attribute and a respective estimated value identified in the lookup request;
   formulating a plurality of queries corresponding to the estimated attribute-value pairs in accordance with a plurality of predefined query types, wherein each formulated query has a corresponding position in a query type hierarchy;
   identifying one or more candidate items by executing one or more of the plurality of queries in accordance with the query type hierarchy; and returning at least one of the candidate items in response to the lookup request for the known item.

2. The method of claim 1, wherein determining the two or more estimated attribute-value pairs includes parsing the lookup request.

3. The method of claim 2, wherein parsing the lookup request includes using predefined structural lookup information in the lookup request to identify the attribute corresponding to each estimated attribute-value pair.

4. The method of claim 2, wherein parsing the lookup request includes automatically identifying at least one attribute corresponding to an estimated attribute-value pair of the determined two or more estimated attribute-value pairs without using predefined structural lookup information in the lookup request.

5. The method of claim 1, wherein each query type of the plurality of predefined query types corresponds to a query for a predefined attribute or a query for a predefined combination of attributes.

6. The method of claim 1, wherein the query types are positioned in the query type hierarchy in order of decreasing precision with respect to each query type's ability to uniquely identify known items.

7. The method of claim 1, wherein the known item is one of: an image, an audio recording, a multimedia object, an item offered by an online vendor, or a database record.

8. The method of claim 1, wherein the known item is an online publication.

9. The method of claim 8, wherein the plurality of attributes includes two or more of the group consisting of: an author attribute, a title attribute, a volume attribute, an issue attribute, a page attribute, a publication date attribute, and a unique object identifier.

10. The method of claim 1, wherein at least one of the attributes in the plurality of attributes comprises a metadata attribute for the known item.

11. The method any of claim 1, further including, after identifying the one or more candidate items, filtering the one or more candidate items to produce the at least one returned candidate item.

12. The method of claim 11, wherein filtering the one or more candidate items includes, for each of the one or more candidate items:
  identifying two or more attribute-value pairs for the candidate item;
  determining if the two or more attribute-value pairs for the candidate item meet predefined criteria with respect to corresponding estimated attribute-value pairs;
  in accordance with a determination that the two or more attribute-value pairs of the candidate item meet the predefined criteria with respect to the corresponding estimated attribute-value pairs, maintaining the candidate item as a candidate to return; and
  in accordance with a determination that the two or more attribute-value pairs of the candidate item do not meet the predefined criteria with respect to the corresponding estimated attribute-value pairs, removing the candidate item as a candidate to return.

13. The method of claim 12, wherein the predefined criteria indicate a predefined high degree of certainty that the candidate item is the known item; and
  returning the at least one of the candidate items further comprises:
    for a respective candidate item, in accordance with a determination that the two or more attribute-value pairs for the candidate item meet the predefined criteria with respect to the corresponding estimated attribute-value pairs, returning only the candidate item.

14. The method of claim 12, wherein failure to meet the predefined criteria indicates a predefined high degree of certainty that a candidate item is not the known item.

15. The method of claim 12, wherein determining if the two or more attribute-value pairs for the candidate item meet the predefined criteria with respect to the corresponding estimated attribute-value pairs includes comparing the two or more attribute-value pairs for the candidate item to the corresponding estimated attribute-value pairs.

16. The method of claim 1, wherein identifying the one or more candidate items includes:
  executing a first subset of the plurality of queries;
  determining whether execution of the first subset of the plurality of queries resulted in less than a predefined count of candidate items; and
  in accordance with a determination that execution of the first subset of the plurality of queries resulted in less than the predefined count of candidate items, executing a second subset of the plurality of queries, wherein each query of the second subset of the plurality of queries has a lower position in the query type hierarchy than any query in the first subset of the plurality of queries.

17. A server system comprising one or more processors and memory, the memory storing instructions that, when executed by the one or more processors, cause the server system to:
  receive a lookup request for the known item, the lookup request including information identifying estimated values for a plurality of attributes of the known item;
  in accordance with the received lookup request:
    determine two or more estimated attribute-value pairs for the known item, each estimated attribute-value pair including an attribute and a respective estimated value identified in the lookup request;
    formulate a plurality of queries corresponding to the estimated attribute-value pairs in accordance with a plurality of predefined query types, wherein each formulated query has a corresponding position in a query type hierarchy;
  identify one or more candidate items by executing one or more of the plurality of queries in accordance with the query type hierarchy; and
  return at least one of the candidate items in response to the lookup request for the known item.

18. A non-transitory computer readable storage medium storing one or more programs, the one or more programs comprising instructions that, when executed by a server system cause the server system to:
  receive a lookup request for the known item, the lookup request including information identifying estimated values for a plurality of attributes of the known item;
  in accordance with the received lookup request:
    determine two or more estimated attribute-value pairs for the known item, each estimated attribute-value pair including an attribute and a respective estimated value identified in the lookup request;
    formulate a plurality of queries corresponding to the estimated attribute-value pairs in accordance with a plurality of predefined query types, wherein each formulated query has a corresponding position in a query type hierarchy;
  identify one or more candidate items by executing one or more of the plurality of queries in accordance with the query type hierarchy; and return at least one of the candidate items in response to the lookup request for the known item.

19. A computer-implemented method of searching for a known item, comprising:

at a server system:
receiving a lookup request for the known item, the lookup request including information identifying estimated values for a plurality of attributes of the known item;
formulating one or more queries corresponding to two or more estimated attribute-value pairs for the known item, in accordance with a plurality of predefined query types and in accordance with the information in the lookup request identifying estimated values for the plurality of attributes of the known item;
identifying a set of candidate items by executing the one or more queries;
evaluating a candidate item of the set of candidate items with respect to consistency of attribute-value pairs for the candidate item with the two or more estimated attribute-value pairs for the known item; and
returning the evaluated candidate item as the known item in accordance with a determination that the attribute-value pairs for the candidate item satisfy a consistency criterion with respect to the two or more estimated attribute-value pairs for the known item.

20. A server system comprising one or more processors and memory, the memory storing instructions that, when executed by the one or more processors, cause the server system to:

receive a lookup request for the known item, the lookup request including information identifying estimated values for a plurality of attributes of the known item;
formulate one or more queries corresponding to two or more estimated attribute-value pairs for the known item, in accordance with a plurality of predefined query types and in accordance with the information in the lookup request identifying estimated values for the plurality of attributes of the known item;
identify a set of candidate items by executing the one or more queries;
evaluate a candidate item of the set of candidate items with respect to consistency of attribute-value pairs for the candidate item with the two or more estimated attribute-value pairs for the known item; and
return the evaluated candidate item as the known item in accordance with a determination that the attribute-value pairs for the candidate item satisfy a consistency criterion with respect to the two or more estimated attribute-value pairs for the known item.

21. A non-transitory computer readable storage medium storing one or more programs, the one or more programs comprising instructions that, when executed by a server system cause the server system to:

receive a lookup request for the known item, the lookup request including information identifying estimated values for a plurality of attributes of the known item;
formulate one or more queries corresponding to two or more estimated attribute-value pairs for the known item, in accordance with a plurality of predefined query types and in accordance with the information in the lookup request identifying estimated values for the plurality of attributes of the known item;
identify a set of candidate items by executing the one or more queries;
evaluate a candidate item of the set of candidate items with respect to consistency of attribute-value pairs for the candidate item with the two or more estimated attribute-value pairs for the known item; and
return the evaluated candidate item as the known item in accordance with a determination that the attribute-value pairs for the candidate item satisfy a consistency criterion with respect to the two or more estimated attribute-value pairs for the known item.

\* \* \* \* \*

UNITED STATES PATENT AND TRADEMARK OFFICE
CERTIFICATE OF CORRECTION

PATENT NO. : 9,886,475 B1
APPLICATION NO. : 14/790120
DATED : February 6, 2018
INVENTOR(S) : Lin et al.

It is certified that error appears in the above-identified patent and that said Letters Patent is hereby corrected as shown below:

In the Claims

In Column 23, Line 38, Claim 11, delete "method any of" and insert -- method of --, therefor.

Signed and Sealed this
First Day of May, 2018

Andrei Iancu
*Director of the United States Patent and Trademark Office*